United States Patent [19]
Ishii

[11] Patent Number: 5,768,389
[45] Date of Patent: Jun. 16, 1998

[54] METHOD AND SYSTEM FOR GENERATION AND MANAGEMENT OF SECRET KEY OF PUBLIC KEY CRYPTOSYSTEM

[75] Inventor: Shinji Ishii, Kanagawaken, Japan

[73] Assignee: Nippon Telegraph and Telephone Corporation, Tokyo, Japan

[21] Appl. No.: 666,905

[22] Filed: Jun. 20, 1996

[30] Foreign Application Priority Data

| Jun. 21, 1995 | [JP] | Japan | 7-155030 |
| Jun. 26, 1995 | [JP] | Japan | 7-159414 |
| Aug. 10, 1995 | [JP] | Japan | 7-204642 |
| Mar. 27, 1996 | [JP] | Japan | 8-072949 |

[51] Int. Cl.$^6$ .................................................. H04K 1/00
[52] U.S. Cl. ............................ 380/30; 380/21; 380/25; 380/51
[58] Field of Search .................. 380/21, 23, 25, 380/49, 51, 30

[56] References Cited

U.S. PATENT DOCUMENTS

| 4,731,842 | 3/1988 | Smith | 380/24 |
| 5,592,561 | 1/1997 | Moore | 380/51 |

OTHER PUBLICATIONS

Schneier, Applied Cryptography, p. 175, 1996.
Proceedings of 1987 IEEE Symposium on Security and Privacy, Apr. 27–29, 1987, Physical Security for the µABYSS System, Steve H. Weingart, pp. 52 to 58.

NTT Human Interface Laboratories, Project Team Article on the Certificate Signing Unit, dated Apr. 19, 1996, pp. 7 and 8; and.

Lecture Notes in Computer Science edited by G. Goos and J. Hartmanis, *Advances in Cryptology—Eurocrypt '88*, May 1988, Some Applications of Multiple Key Ciphers, pp. 454 to 467.

*Primary Examiner*—David C. Cain
*Attorney, Agent, or Firm*—Banner & Witcoff, Ltd.

[57] ABSTRACT

A method and a system for generating and managing a secret key of a public key cryptosystem, in which the secret key is generated inside a tamper resistant device, and stored into a storage region in a personal portable device from which the secret key cannot be read out of the personal portable device, while the personal portable device is inside the tamper resistant device. Here, the secret key can be reproduced by collecting the partial secret keys from those arbitrators who judge that the secret key reproduction is appropriate. Also, the secret key is generated inside a tamper resistant personal portable device, and stored into a storage region in the tamper resistant personal portable device from which the secret key cannot be read out of the tamper resistant personal portable device. Here, the secret key can be reproduced by using the partial secret keys for constituting the secret key from all entities sharing interests with a user of the tamper resistant personal portable device.

79 Claims, 23 Drawing Sheets

FIG.9

- 11 — INDISPENSABLE CONDITION: PERSONAL PORTABLE DEVICE OWNER

- 12 — ORDER CONDITION: PAST UTILIZATION RECORD

- 13 — ORDER CONDITION:
  - 13-1 THRESHOLD CONDITION: SERVICE PROVIDER A
  - 13-2 THRESHOLD CONDITION: SERVICE PROVIDER B
  - 13-3 THRESHOLD CONDITION: SERVICE PROVIDER C
  - 13-4 THRESHOLD CONDITION: SERVICE PROVIDER I

- 14 — ORDER CONDITION:
  - 14-1 THRESHOLD CONDITION: APPARATUS MANAGER A
  - 14-2 THRESHOLD CONDITION: APPARATUS MANAGER B
  - 14-3 THRESHOLD CONDITION: APPARATUS MANAGER C
  - 14-4 THRESHOLD CONDITION: APPARATUS MANAGER J

- 15 — ORDER CONDITION: LIST OF APPROVED PERSONS

METHOD AND SYSTEM FOR GENERATION AND MANAGEMENT OF SECRET KEY OF PUBLIC KEY CRYPTOSYSTEM

BACKGROUND OF THE INVENTION

1. Field of the Invention

The present invention relates to a method and a system for generation and management of a secret key of a public key cryptosystem, such that a secret key can be kept in secret from everyone and usable only by a specific user.

2. Description of the Background Art

When digital data having copyrights such as speech/video data or execution programs are to be offered for sale through networks, the problems of user authentication, delivery confirmation, and illegal digital copy protection must be addressed.

As a method for resolving the user authentication problem, there is a method which utilizes the public key cryptosystem as a digital cryptographic algorithm. In the following, the public key cryptosystem will be briefly described.

The digital cryptographic algorithm includes a secret key cryptosystem (a shared key cryptosystem) and a public key cryptosystem.

The secret key cryptosystem is suitable for high speed processing, but it uses the same shared key for an encryption key and a decryption key, so that this shared key must be kept in secret only among communicating parties.

On the other hand, the public key cryptosystem requires a larger amount of computations compared with the secret key cryptosystem so that it is not suitable for high speed processing, but it uses different keys for an encryption key and a decryption key, so that the encryption key can be disclosed to public and a secret distribution of a key as required for the shared key of the secret key cryptosystem is unnecessary.

However, in the public key cryptosystem, anyone can produce a ciphertext because the encryption key is disclosed to public. For this reason, when an enciphered message is received, it is necessary to certify who has sent this enciphered message. To this end, a sender authentication utilizing the signature has been developed.

A representative example of the public key cryptosystem equipped with a sender authentication function is the RSA cryptosystem. In this RSA cryptosystem, an encryption key is used at a time of encipherment and a decryption key is used at a time of decipherment, while a decryption key is also used at a time of producing a signature and an encryption key is used at a time of verifying that signature.

Regardless of which particular public key cryptosystem is used, there is a need for a function of a certification issuing center which discloses a signer and his encryption key to public truthfully in order for communicating parties to verify each other correctly. This certification issuing center is required to satisfy the following requirement: "The certification issuing center and workers at this center must issue and disclose to public a certification which certifies a relation between an encryption key and a registered person accurately and truthfully." (Such a certification issuing center (key management center) is called trust in the cryptography theory).

Now, there are digital data such as programs for personal computers, video data, music data, etc. which are offered as commercial goods, but in a case of the digital data, in general, data are not degraded even after repeated copies, such as a copy from an original and a copy from a copy, so that it is difficult to exterminate the illegal copies and a serious damage can be caused by the illegal copies.

Conventional known measures against such illegal copies include (1) a scheme for providing a protection on a data supply medium (such as a floppy disk) to prevent a copying itself, and (2) a scheme in which a copying itself is allowed but the digital data contents are enciphered so that a key is necessary in order to execute or reproduce most parts of programs, video data, music data, etc., and the key is distributed to only those persons who actually paid the price or whose intention to pay the price can be confirmed by utilizing the networks. In the latter scheme, the digital data contents should be usable by applying a high speed deciphering, so that the secret key cryptosystem is utilized.

The former scheme is often utilized in a game software for a personal computer, but the protection can also restrict a legal copying by a legitimate user such as a copying required at a time of installing into a hard disk, or a copying required at a time of producing a back-up, so that it has as many demerits as merits, and for this reason this scheme is hardly used in a business software.

On the other hand, the latter scheme is considered to be highly prospective and adaptive because the digital data contents can be freely copied and distributed to many while a trial use of a part of the digital data contents is possible, even though a full scale use of the digital data contents is not possible until a key is obtained through a legal process such as the payment of the price.

The technical issues need to be addressed in order to realize the latter scheme utilizing a key are a method for confirming an intention to pay, a method for distributing a key, and a method for managing a key.

For a confirmation of a user's intention to pay, a use of the signature function is effective. For a distribution of a shared key to be used for deciphering the enciphered digital data, a method utilizing the public key cryptosystem is effective.

As for a method for managing a key, it is meaningless if a user can copy the digital data deciphered by the shared key, so that it is effective to use a method in which the deciphering is carried out inside a personal computer, and a cover is provided on the deciphered digital data so that even a user himself cannot contact the deciphered digital data.

In addition, it is problematic if a user can freely distribute the shared key, so that it is effective to additionally use a method in which the shared key is enciphered by a secret key of the public key cryptosystem, and a secret key of the public key cryptosystem to be used for deciphering both the digital data and the shared key is kept out of reach of even a user himself.

Yet, even when such a key management method is utilized, a person who generated the session key of the public key cryptosystem of a user can forge a signature for a user's intention to pay, so that strictly speaking, it is impossible to judge if a signature is a true signature reflecting a user's intention or a forged signature. For this reason, conventionally, it has been presupposed that persons (key managers) who are involved in the generation of the key never commit an illegal act.

However, considering the fact that the most of the illegal acts actually committed up to the present are the illegal acts committed by these key managers, it must be assumed that it is highly plausible for the key managers to commit illegal acts in future. In other words, even when the key managers are actually innocent, it is impossible to completely clear the key manager's suspicion.

In summary, with regard to a purchase and a use of digital data that can easily be copied, a user and a key manager must satisfy the following conditions.

(1) A key for deciphering the digital data (a secret key of the public key cryptosystem and a shared key of a secret key cryptosystem) should not be known (or generated) by anyone including a user and a key manager.

(2) It must be possible to prove that a key for use in a signature to certify a user's intention to pay (a secret key of the public key cryptosystem) cannot be used by anyone except for a user.

However, up to the present, it has been impossible to prove that only a user can use a secret key of the public key cryptosystem which should not be known by anyone including a user.

Moreover, up to the present, when the secret key disappeared or became unusable, it has been impossible to reproduce (revive) a secret key of the public key cryptosystem which should not be known by anyone including a user.

SUMMARY OF THE INVENTION

It is therefore an object of the present invention to provide a method and a system for generation and management of a secret key of the public key cryptosystem, in which it is possible to prove that only a user can use the secret key which should not be known by anyone including a user, such that an illegal copy of digital data can be prevented and an infallible confirmation of a user's intention to pay can be made.

It is another object of the present invention to provide a method and a system for generation and management of a secret key of the public key cryptosystem, in which the secret key which should not be known by anyone including a user can be reproduced (revived) even when the secret key disappeared or became unusable.

It is another object of the present invention to provide a method and a system for generation and management of a secret key of the public key cryptosystem, in which the secret key of the public key cryptosystem can be generated and managed within a personal portable device, without requiring a specialized device for writing the secret key into a personal portable device.

It is another object of the present invention to provide a method and a system for generation and management of a secret key of the public key cryptosystem, in which the secret key of the public key cryptosystem can be reproduced (revived), without requiring a specialized device for writing the secret key into a personal portable device.

According to one aspect of the present invention there is provided a method for generating and managing a secret key of a public key cryptosystem, comprising the steps of: (a) generating a secret key inside a tamper resistant device; and (b) storing the secret key generated at the step (a) into a storage region in a personal portable device from which the secret key cannot be read out of the personal portable device, while the personal portable device is inside the tamper resistant device.

According to another aspect of the present invention there is provided a tamper resistant system for generating and managing a secret key of a public key cryptosystem, comprising: first means for generating the secret key inside the tamper resistant system; and second means for storing the secret key generated by the first means into a storage region in a personal portable device from which the secret key cannot be read out of the personal portable device, while the personal portable device is inside the tamper resistant system.

According to another aspect of the present invention there is provided a method for generating and managing a secret key of a public key cryptosystem, comprising the steps of: (a) generating a public key and a secret key inside a first tamper resistant device; (b) storing the secret key generated at the step (a) into a first storage region in a personal portable device from which the secret key cannot be read out of the personal portable device, while the personal portable device is inside the first tamper resistant device; (c) producing a certification inside a second tamper resistant device from a user's personal data and the public key generated at the step (a); and (d) storing the certification produced at the step (c) into a second storage region in the personal portable device from which the certification can be read out of the personal portable device, while the personal portable device is inside the first tamper resistant device.

According to another aspect of the present invention there is provided a system for generating and managing a secret key of a public key cryptosystem, comprising: a first tamper resistant device having: first means for generating a public key and the secret key inside the first tamper resistant device; second means for storing the secret key generated by the first means into a first storage region in a personal portable device from which the secret key cannot be read out of the personal portable device, while the personal portable device is inside the first tamper resistant device; and third means for storing the certification into a second storage region in the personal portable device from which the certification can be read out of the personal portable device, while the personal portable device is inside the first tamper resistant device; and a second tamper resistant device having: fourth means for producing the certification inside the second tamper resistant device from a user's personal data and the public key generated by the first means, such that the third means stores the certification produced by the fourth means.

According to another aspect of the present invention there is provided a method for reproducing a secret key of a public key cryptosystem, comprising the steps of: (a) designating a plurality of arbitrators for separately judging an appropriateness of a secret key reproduction; (b) distributing partial secret keys dividing an information necessary in reproducing the secret key among the arbitrators; (c) collecting the partial secret keys from those arbitrators who judge that the secret key reproduction is appropriate when the secret key reproduction is requested; and (d) reproducing the secret key from the partial secret keys collected at the step (c) when the partial secret keys collected at the step (c) satisfy a prescribed secret key reproduction necessary condition.

According to another aspect of the present invention there is provided a system for reproducing a secret key of a public key cryptosystem, comprising: distributing means for distributing partial secret keys which divide an information necessary in reproducing the secret key among a plurality of arbitrators for separately judging an appropriateness of a secret key reproduction; collecting means for collecting the partial secret keys from those arbitrators who judge that the secret key reproduction is appropriate when the secret key reproduction is requested; and reproducing means for reproducing the secret key from the partial secret keys collected by the collecting means when the partial secret keys collected by the collecting means satisfy a prescribed secret key reproduction necessary condition.

According to another aspect of the present invention there is provided a method for generating and managing a secret key of a public key cryptosystem, comprising the steps of: (a) generating a secret key inside a tamper resistant personal portable device; and (b) storing the secret key generated at the step (a) into a storage region in the tamper resistant personal portable device from which the secret key cannot be read out of the tamper resistant personal portable device.

According to another aspect of the present invention there is provided a tamper resistant personal portable device for generating and managing a secret key of a public key cryptosystem, comprising: first means for generating a secret key inside the tamper resistant personal portable device; and second means for storing the secret key generated by the first means into a storage region from which the secret key cannot be read out of the tamper resistant personal portable device.

According to another aspect of the present invention there is provided a method for generating and managing a secret key of a public key cryptosystem, comprising the steps of: (a) separately entering each one of partial secret keys for constituting the secret key from all entities sharing interests with a user of a tamper resistant personal portable device, into the tamper resistant personal portable device, each partial secret key being secretly managed by each entity; (b) generating a secret key inside the tamper resistant personal portable device from the partial secret keys entered at the step (a); and (c) storing the secret key generated at the step (a) into a storage region in the tamper resistant personal portable device from which the secret key cannot be read out of the tamper resistant personal portable device.

According to another aspect of the present invention there is provided a tamper resistant personal portable device for generating and managing a secret key of a public key cryptosystem, comprising: first means for separately entering each one of partial secret keys for constituting the secret key from all entities sharing interests with a user of the tamper resistant personal portable device, into the tamper resistant personal portable device, each partial secret key being secretly managed by each entity; second means for generating a secret key inside the tamper resistant personal portable device from the partial secret keys entered by the first means; and third means for storing the secret key generated by the second means into a storage region from which the secret key cannot be read out of the tamper resistant personal portable device.

According to another aspect of the present invention there is provided a method for handling digital data using public key cryptosystems, comprising the steps of: (a) generating at a user's side a public key and a secret key of a first public key cryptosystem for signing; (b) registering the public key of the first public key cryptosystem at a certification issuing center; (c) signing the public key of the first public key cryptosystem by using a secret key of the certification issuing center, and disclosing the signed public key as a user's certification; (d) generating at a copyright owner's side a public key and a secret key of a second public key cryptosystem for deciphering digital data, and storing the secret key of the second public key cryptosystem into a storage region in a tamper resistant personal portable device from which the secret key of the second public key cryptosystem cannot be read out of the tamper resistant personal portable device; and (e) providing the tamper resistant personal portable device and the public key of the second public key cryptosystem to the user's side, such that the user's side can utilize the digital data provided by the copyright owner's side by carrying out deciphering processing using the secret key of the second public key cryptosystem and signing processing using the secret key of the first public key cryptosystem within the tamper resistant personal portable device.

Other features and advantages of the present invention will become apparent from the following description taken in conjunction with the accompanying drawings.

BRIEF DESCRIPTION OF THE DRAWINGS

FIG. 9 is a diagram showing an exemplary secret key reproduction necessary condition used in the third embodiment of the present invention.

DETAILED DESCRIPTION OF THE PREFERRED EMBODIMENTS

In the following, various embodiments of a method and a system for generation and management of a secret key of the public key cryptosystem according to the present invention will be described for an exemplary case of using the RSA cryptosystem which is the most widely used public key cryptosystem having both a cipher function and an authentication function.

Referring now to FIG. 1 to FIG. 4, the first embodiment of a method and a system for generation and management of a secret key of the public key cryptosystem according to the present invention will be described in detail.

Figure 1:
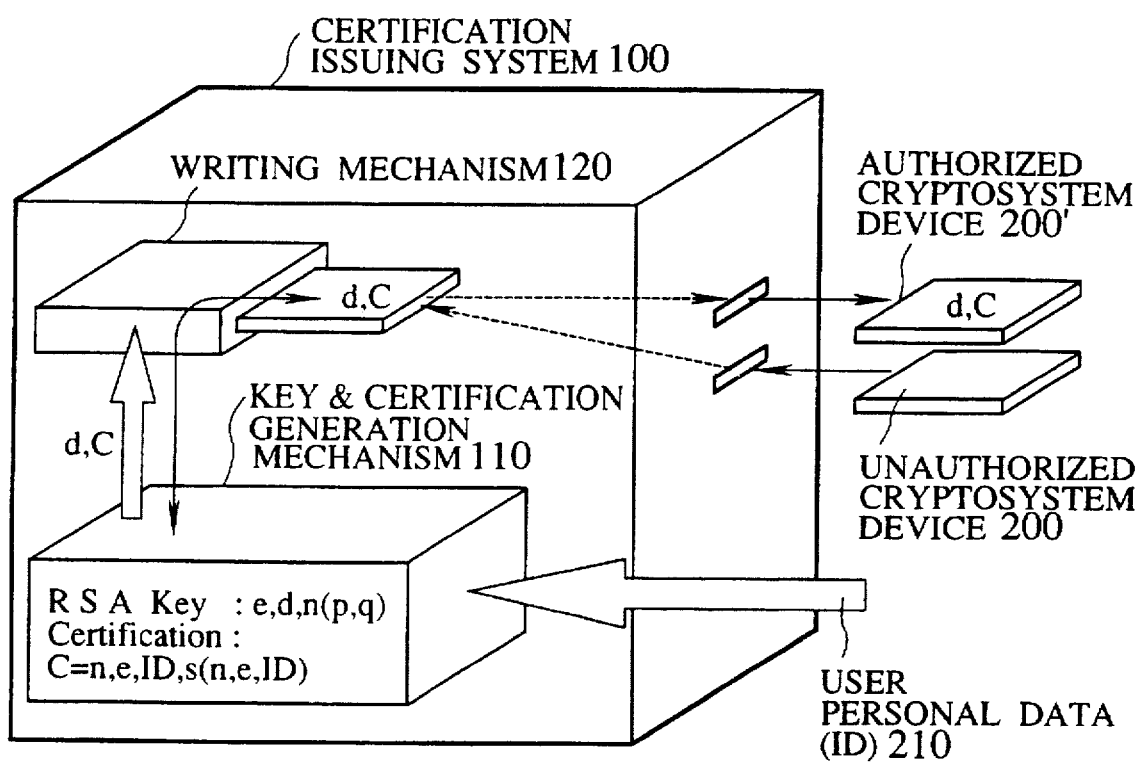
FIG. 1 is a schematic diagram of a conceptual configuration of a certification issuing system in the first embodiment of the present invention.

FIG. 1 shows a conceptual configuration of a certification issuing system 100 used in this first embodiment, which contains a key and certification generation mechanism 110 and a writing mechanism 120.

The key and certification generation mechanism 110 is formed by a container which is physically and electrically protected such that a reading of a generated secret key and a tampering of a generated certification cannot be made by anyone in any way whatsoever. This container is specially devised such that even if it is forced to open up, the internal structure becomes completely inoperable, and after it is forced to open up, it cannot be restored into an original state. This type of a device is called tamper resistant device, an example of which is the Certificate Issuing System manufactured by the VeriSign, Inc. (See, http://www.verisign.com/products/cis.html for details.)

The writing mechanism 120 writes the secret key and the certification generated by the key and certification generation mechanism 110 into a secret key storable RSA cryptosystem processing device (which can be provided in a form of a PC card, an IC card, etc., and which will be abbreviated as a cryptosystem device hereafter) inserted into the certification issuing system 100.

An unauthorized cryptosystem device 200 is to be inserted as a whole into the certification issuing system 100, while a user personal data (ID) is entered into the certification issuing system 100 by means of keys (not shown) provided on the certification issuing system 100. Then, the secret key and the certification generated by the key and certification generation mechanism 110 are written into this cryptosystem device 200 by the writing mechanism 120 within the certification issuing system 100, and the authorized cryptosystem device 200' is returned from the certification issuing system 100.

Here, the cryptosystem device 200 has a structure for preventing anyone from reading the secret key written therein. In general, a user who is the owner of the secret key may be allowed to know the secret key, but the cryptosystem device 200 of this first embodiment is designed such that even an owner of this device cannot learn the value of the secret key stored therein, in consideration to the fact that once the secret key becomes known, there is a possibility for allowing the illegal digital copy of the digital data. Also, the certification written in the cryptosystem device 200 is a signed certification which is a public information so that this certification can be read by anyone freely but should not be tampered. For this reason, the cryptosystem device 200 provides a writing protection for preventing a writing of the certification outside the certification issuing system 100. An example of this type of tamper resistant device is disclosed in S. H. Weingart, "Physical Security for the μASBYSS System", Proceedings 1987 IEEE Symposium on Security and Privacy, pp. 52–58, April 1987.

The key and certification generation mechanism 110 generates RSA public key (e, n) from the user's personal data (ID), and RSA secret key d from the public key. In addition, the key and certification generation mechanism 110 also produces a certification {n, e, ID} from the public key, and attaches a signature s(n, e, ID) to this certification. Here, the signed certification will be denoted as C.

The writing mechanism 120 then writes the secret key d and and the signed certification C into the unauthorized cryptosystem device 200 inserted by a user, and ejects it as the authorized cryptosystem device 200'.

Figure 2:
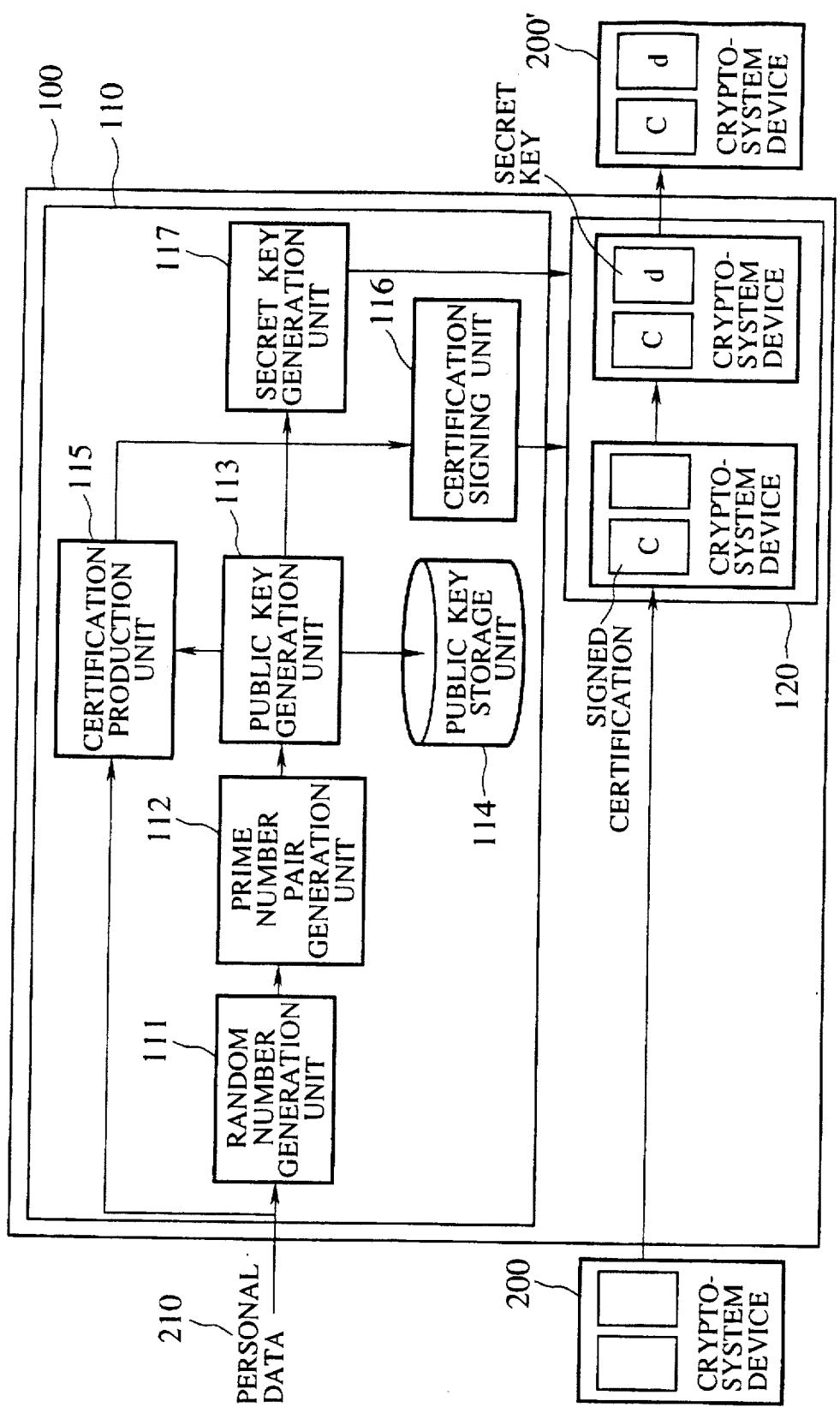
FIG. 2 is a block diagram of an exemplary configuration of a key and certification generation mechanism in the certification issuing system of FIG. 1.

FIG. 2 shows an exemplary configuration of the key and certification generation mechanism 110 along with a flow of writing into the cryptosystem device 200 in the certification issuing system 100. In FIG. 2, the key and certification generation mechanism 110 comprises: a random number generation unit 111 into which the personal data 210 is entered; a prime number pair generation unit 112 connected with the random number generation unit 111; a public key generation unit 113 connected with the prime number pair generation unit 112; a public key storage unit 114 connected with the public key generation unit 113; a certification production unit 115 into which the personal data 210 is also entered and which is also connected with the public key generation unit 113; a certification signing unit 116 connected with the certification production unit 115; and a secret key generation unit 117 which is also connected with the public key generation unit 113.

Figure 3:
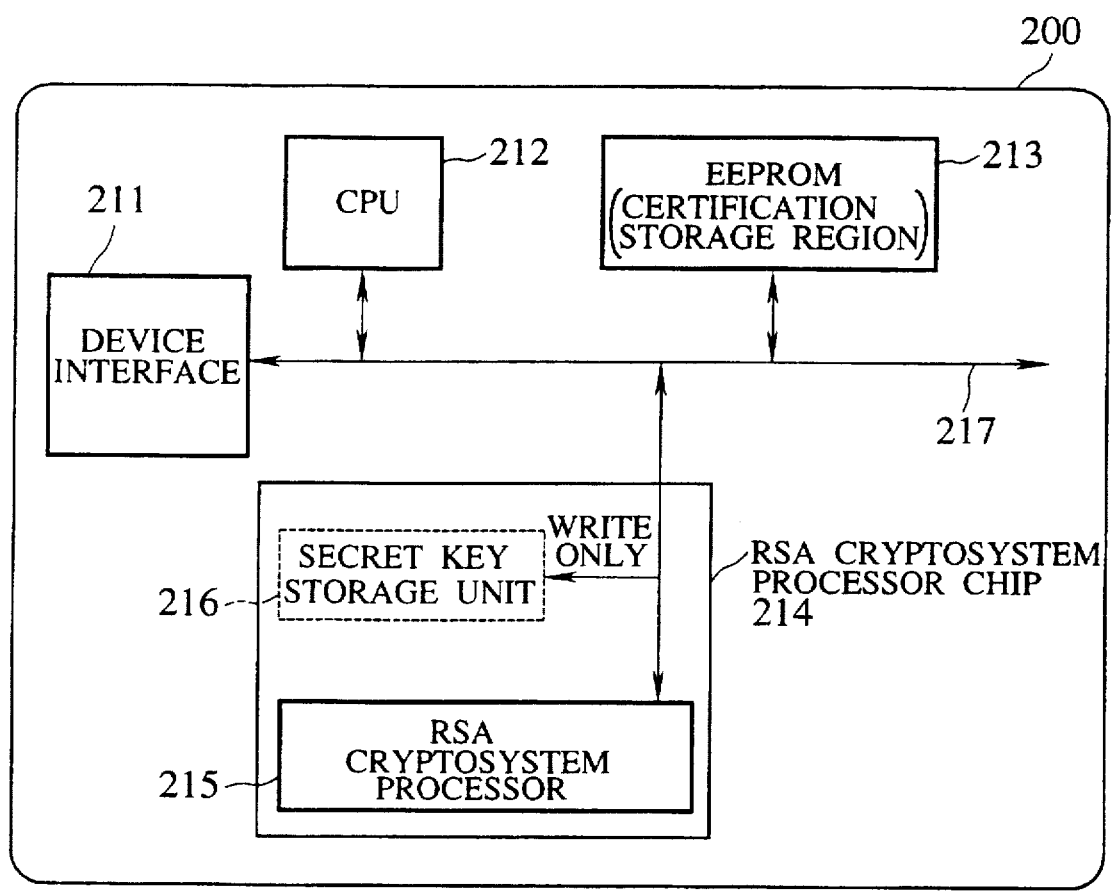
FIG. 3 is a block diagram of an exemplary configuration of a cryptosystem device in the first embodiment of the present invention.

FIG. 3 shows an exemplary configuration of the cryptosystem device 200, which comprises: a device interface 211, a CPU 212, an EEPROM (certification storage region 213, and an RSA cryptosystem processor chip 214, which are connected through a bus 217. The RSA cryptosystem processor chip 214 includes an RSA cryptosystem processor 215 and a secret key storage unit 216. Here, the secret key storage unit 216 is a write only register so that the secret key written therein cannot be read out. Only the decoding (signing) processing result from the RSA cryptosystem processor 215 can be read out from the RSA cryptosystem processor chip 214. Also, the (signed) certification written in the EEPROM 213 is readable, but the writing protection for preventing a writing of the certification outside the certification issuing system 100 is provided.

Figure 4:
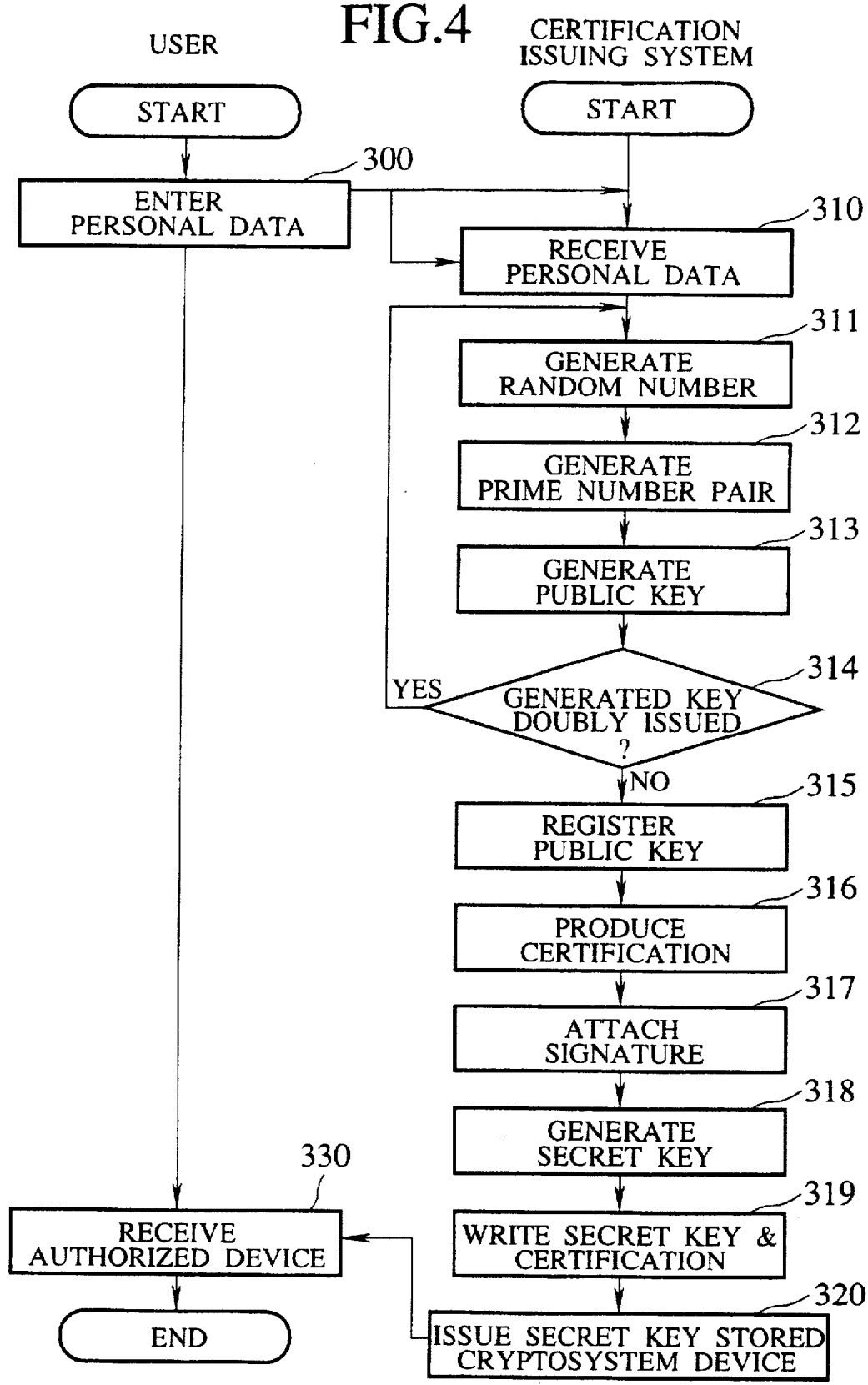
FIG. 4 is a flow chart for an operation to issue an authorized cryptosystem device in the certification issuing system of FIG. 1.

Now, the operation to issue the authorized cryptosystem device to be used by a specific user in the certification issuing system 100 of this first embodiment is carried out according to the flow chart of FIG. 4 as follows.

First, the user enters the personal data (ID) 210 which can uniquely identify this user and which can be disclosed to public (step 300). The key and certification generation mechanism 110 of the certification issuing system 100 then receives the entered personal data 210 (step 310), and generates a random number at the random number generation unit 111 (step 311). This random number will be used as a seed required in the prime number generation. This random number generation unit 111 is required to satisfy the following conditions: (1) it is very difficult to guess the result of the random number generation from the input data (i.e., it is one way random), and (2) the output results are evenly dispersed even for biased input data.

Then, from the random number generated at the random number generation unit 111, a pair of two prime numbers (p, q) is generated at the prime number pair generation unit 112 (step 312). The properties generally required for this prime number pair generation unit 112 is described in the ITU-T recommendation X. 509 Annex C.

Then, from this prime number pair (p, q), the public key (e, n(=p×q)) is generated at the public key generation unit 113 (step 313). At this point, whether the generated public key is doubly issued or not, i.e., the generated public key is overlapping with some previously generated public key or not, is checked by referring to the public key storage unit 114 (step 314). If the generated public key is doubly issued, the operation returns to the above step 311, whereas otherwise the generated public key (e, n(p, q)) is registered into the public key storage unit 114 (step 315).

Next, from the entered personal data (ID) 210 and the public key (e, n(p, q)) generated at the public key generation unit 113, the certification {n, e, ID} is produced at the certification production unit 115 (step 316). The items required for this certification are described in the ITU-T recommendation X. 509.

Then, to this certification produced at the certification production unit 115, the signature s(n, e, ID) of the certification issuer is attached by using public key and the secret key of this certification issuing system 100 at the certification signing unit 116 (step 317). Here, the certification issuer only guarantees a link between the public key and the personal data, and even this certification issuer does not know the secret key.

Then, from the public key generated at the public key generation unit 113, the secret key d is generated at the secret key generation unit 117 (step 318).

On the other hand, the cryptosystem device (such as a PC card, an IC card, etc.) 200 is inserted as a whole into the certification issuing system 100. Then, the writing mechanism 120 writes the signed certification C obtained at the certification signing unit 116 and the secret key d generated at the secret key generation unit 117 into the inserted cryptosystem device 200 (step 319), and the authorized cryptosystem device 220' is ejected from the certification issuing system 100 (step 320), such that the user receives this authorized cryptosystem device 200' (step 330).

In this first embodiment, the key and certification generation mechanism 110 of the certification issuing system 100 is a covered tamper resistant device which cannot be touched by anyone, so that no one can read out the secret key or tamper the certification. In addition, the secret key written in the cryptosystem device 200 is not readable. Consequently, it is possible to prove that the user is the only one who expressed the intention to pay, while it is also possible to prove that the user cannot copy the digital data without a permission from the information provider.

In other words, the secret key of the public key cryptosystem is produced in such a manner that the value of this secret key cannot be known by anyone, including those who are involved in the key generation. Then this secret key is stored in such a manner that the value of this secret key cannot be read out and known by anyone, including the user. In this manner, the secret key is usable only within the personal portable device owned by the user, so that only the user can use this secret key while even this user does not know the value of the secret key.

Thus, according to this first embodiment, it becomes possible to provide a method and a system for generation and management of a secret key of the public key cryptosystem, in which it is possible to prove that only a user can use the secret key which should not be known by anyone including a user, such that an illegal copy of digital data can be prevented and an infallible confirmation of a user's intention to pay can be made.

As a consequence, in a case of offering computer programs or digital speech/video data having copyrights for sales through networks in exchange to the payment of charges, even if there is a money trouble among the copyright owner, seller, and purchaser, it becomes possible to identify a person who committed the illegal act from a third person's viewpoint according to this first embodiment, so that it can provide an effective measure against the illegal act.

Figure 5:
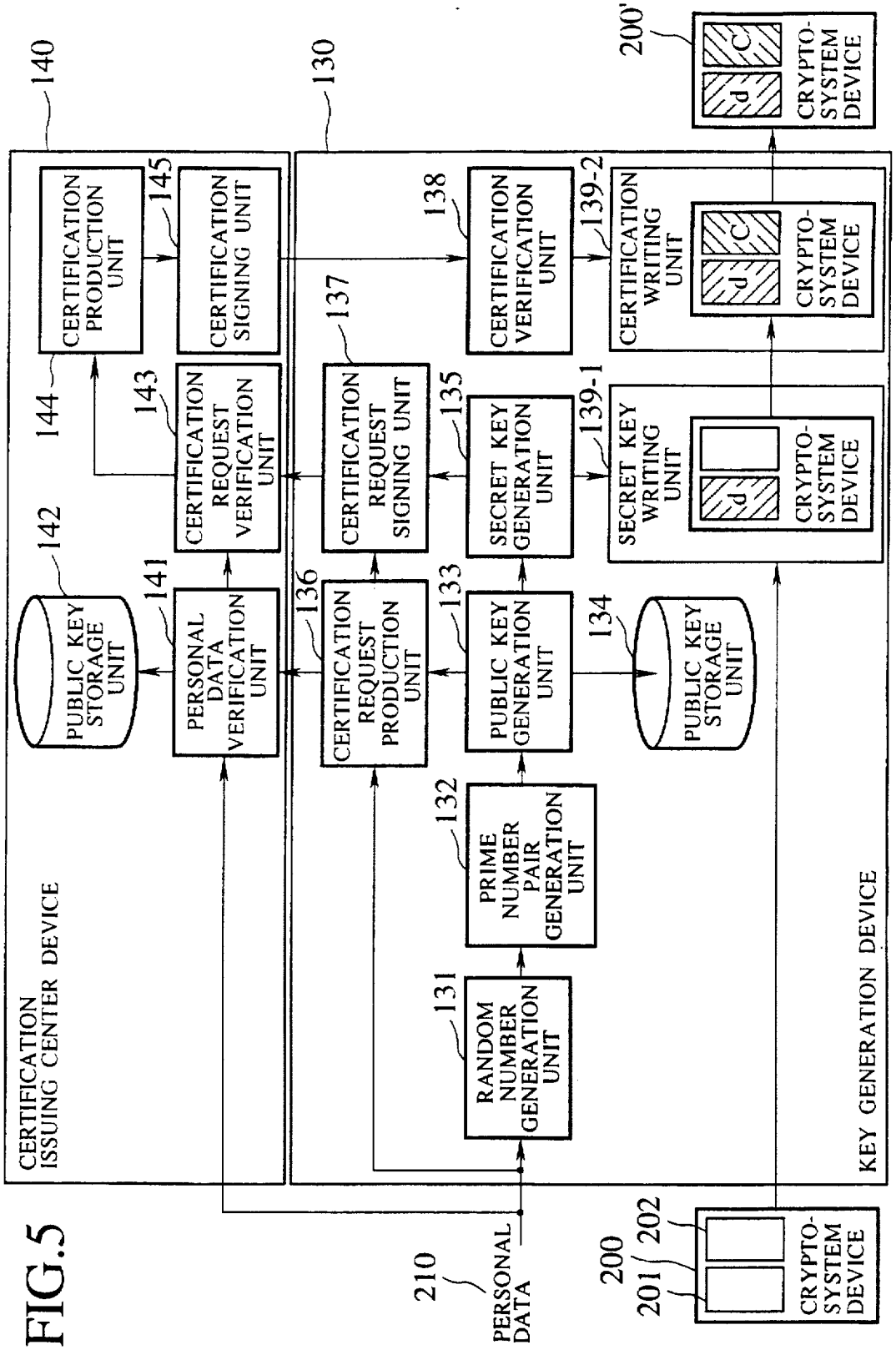
FIG. 5 is a block diagram of a configuration of a system in the second embodiment of the present invention.
Figure 6:
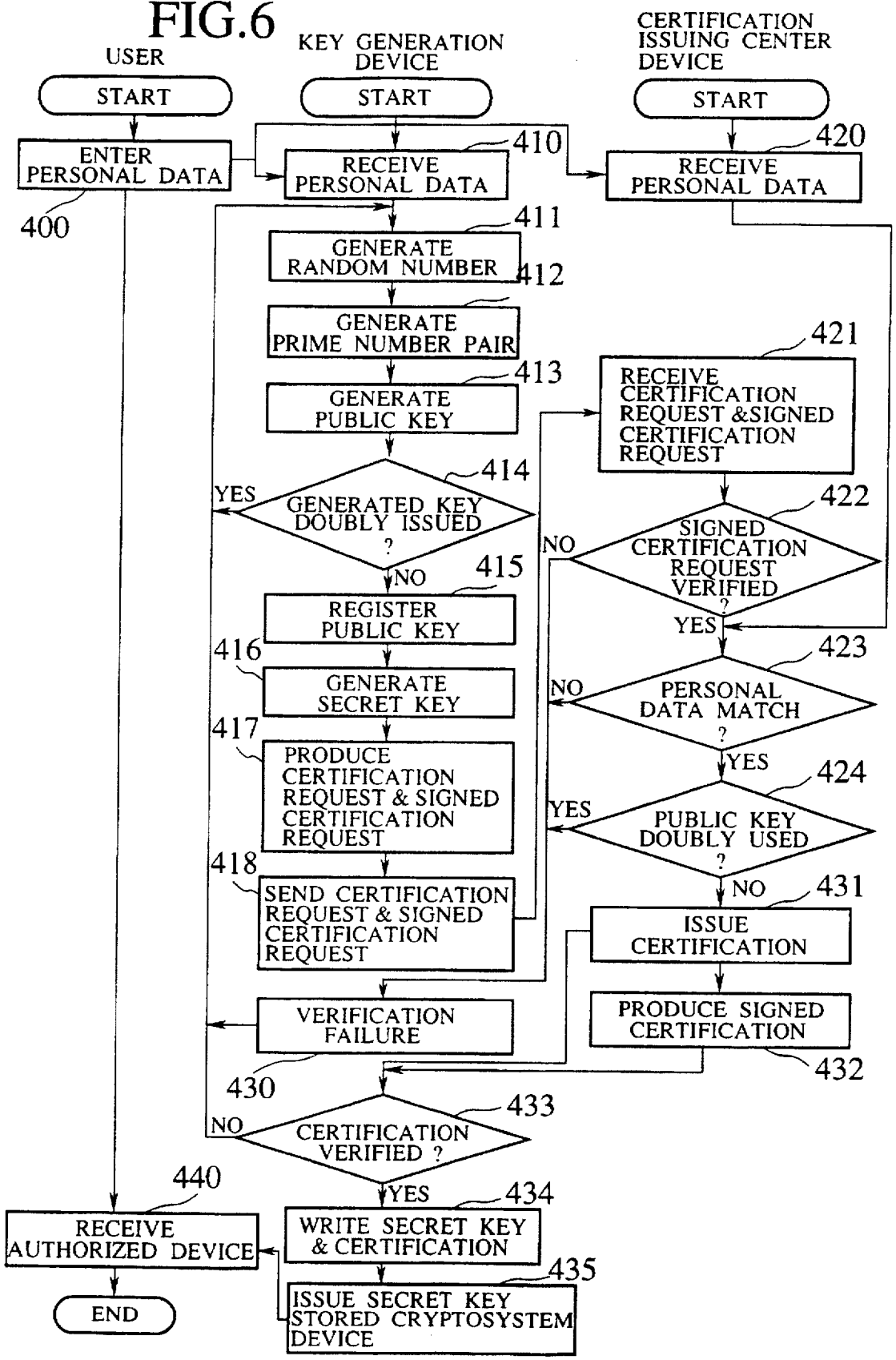
FIG. 6 is a flow chart for an operation to issue an authorized cryptosystem device in the system of FIG. 5.

Referring now to FIG. 5 to FIG. 6, the second embodiment of a method and a system for generation and management of a secret key of the public key cryptosystem according to the present invention will be described in detail. This second embodiment is directed to a case in which the key generation function and the certification issuing function of the certification issuing system 100 in the first embodiment described above are separated. In the following, this second embodiment will be described for an exemplary case in which a key is generated for use by a specific user.

FIG. 5 shows a configuration of a system in this second embodiment, which includes a certification issuing center device 140, a key generation device 130, and a cryptosystem device 200 similar to that used in the first embodiment described above.

The certification issuing center device 140 comprises: a personal data verification unit 141 into which the personal data 210 is entered; a public key storage unit 142 connected with the personal data verification unit 141; a certification request verification unit 143 which is also connected with the personal data verification unit 141; a certification generation unit 144 connected with the certification request verification unit 143; and a certification signing unit 145 connected with the certification generation unit 144.

The key generation device 130 comprises: a random number generation unit 131 into which the personal data 210 is entered; a prime number pair generation unit 132 connected with the random number generation unit 131; a public key generation unit 133 connected with the prime number pair generation unit 132; a public key storage unit 134 connected with the public key generation unit 133; a secret key generation unit 135 which is also connected with the public key generation unit 133; a certification request production unit 136 into which the personal data 210 is also entered and which is connected with the public key generation unit 133 and to be connected with the personal data verification unit 141 of the certification issuing center device 140; a certification request signing unit 137 which is connected with the secret key generation unit 135 and the certification request production unit 136 and to be connected with the certification request verification unit 143 of the certification issuing center device 140; a certification verification unit 138 to be connected with the certification signing unit 145 of the certification issuing center device 140; a secret key writing unit 139-1 connected with the secret key generation unit 135; and a certification writing unit 139-2 connected with the certification verification unit 138.

The cryptosystem device 200 is provided in a form of an IC card, for example, and containing a secret key storage unit 201 and a certification storage unit 202.

Each of the certification issuing center device 140, the key generation device 130, and the cryptosystem device 200 is formed by a covered tamper resistant device similar to that used in the first embodiment described above so that no one can touch its interior.

Note that there are cases in which it is inconvenient if the certification issuing center device 140 and the key generation device 130 are provided at a geographical identical location. For instance, the key generation device 130 can be handled by each cryptosystem device issuing service provider, but as long as the identical certification issuing center device 140 is used, the users owning the cryptosystem devices issued by different cryptosystem device issuing service providers can authenticate each other, so that it is more convenient if there is no need to use the same number of the certification issuing center devices 140 and the key generation devices 130.

For this reason, in this second embodiment, the certification issuing center device 140 and the key generation device 130 are assumed to be located at geographically distanced locations, and connected through a communication path (such as a telephone line, ISDN, LAN, etc.). Here, it is more likely that an available communication path is a tamperable and therefore not necessarily reliable communication path, so that this second embodiment accounts for a possibility of the tampering at the communication path.

Now, the operation to issue the authorized cryptosystem device to be used by a specific user in the system of this second embodiment is carried out according to the flow chart of FIG. 6 as follows.

First, the user enters the personal data (ID) 210 which can uniquely identify this user (step 400). For this personal data, it is ideal to use a physical characteristic data that can uniquely identify the user such as that of a fingerprint, a voiceprint, a retina, etc., but a use of such a physical characteristic data also requires a device for acquiring such a physical characteristic data and a means for judging whether the acquired data is really that of the user, so that except for some special cases it is more realistic at a present to use an ID data such as a passport, a resident card, a driver's licence, etc., which is issued by a public organization. The personal data 210 obtained this manner is then received at the certification issuing center device 140 and the key generation device 130 (steps 410 and 420).

At the key generation device 130, a random number is generated at the random number generation unit 131 (step 411). This random number will be used as a seed required in the prime number generation. This random number generation unit 131 is required to satisfy the following conditions: (1) it is very difficult to guess the result of the random number generation from the input data (i.e., it is one way random), and (2) the output results are evenly dispersed even for biased input data.

Then, from the random number generated at the random number generation unit 131, a pair of two prime numbers (p, q) is generated at the prime number pair generation unit 132 (step 412). The properties generally required for this prime number pair generation unit 132 is described in the ITU-T recommendation X. 509 Annex C.

Then, from this prime number pair (p, q), the public key (e, n(p, q)) is generated at the public key generation unit 133 (step 413). At this point, whether the generated public key is doubly issued or not, i.e., the generated public key is overlapping with some previously generated public key or not, is checked by referring to the public key storage unit 134 (step 414). If the generated public key is doubly issued, the operation returns to the above step 411, whereas otherwise the generated public key (e, n(p, q)) is registered into the public key storage unit 134 (step 415).

Then, from the public key generated at the public key generation unit 133, the secret key d is generated at the secret key generation unit 135 (step 416).

On the other hand, from the entered personal data (ID) 210 and the public key (e, n(p, q)) generated at the public key generation unit 133, the certification request for requesting a production of the certification is produced at the certification request production unit 136 and this certification request is signed at the certification request signing unit 137 by using the secret key generated at the secret key generation unit 135 (step 417). The items required for this certification request are described in the ITU-T recommendation X. 509.

Here, the certification request is signed because the certification request is subsequently going to be sent to the certification issuing center device 140, but there is a possibility for its content to be tampered in a middle of the communication path if the certification request alone is sent, so that it is necessary to make it possible to detect the tampering. The certification request obtained at the certification request production unit 136 and the signed certification request obtained at the certification request signing unit 137 are then sent to the certification issuing center device 140 via the communication path (step 418).

When the certification request and the signed certification request are received from the key generation device 130 (step 421), the certification issuing center device 140 verifies whether the received certification request has been tampered on the communication path or not, by taking out the public key contained in the certification request and verifying the signed certification request using the taken out public key at the certification request verification unit 143 (step 422). When the certification request is verified, this fact can be a proof that the certification request has certainly not been tampered on the communication path.

However, a case of tampering at a time of entering the personal data 210 at the key generation device 130 cannot be detected by this verification, so that the certification issuing center device 140 checks whether the personal data directly received from the user and the personal data contained in the certification request match with each other or not at the personal data verification unit 141 (step 423). When these personal data match, the certification issuing center device 140 checks whether the public key is doubly used or not by referring to the public key storage unit 142 (step 424).

If any of the checking at the steps 422, 423, and 424 fails, it is regarded as a case of the verification failure (step 430), so that the operation returns to the step 411 described above.

If the public key is not overlapping with any previously used public key at the step 424, the certification issuing center device 140 produces and issues the certification at the certification production unit 144 from this certification request (step S431). Here, the certification issuer only guarantees a link between the public key and the personal data, and even this certification issuer does not know the secret key. (At this point, the secret key exists only within the secret key generation unit 135 in this second embodiment.)

The certification issuing center device 140 then returns the produced certification to the key generation device 130, but there is also a possibility for tampering on the communication path at this point, so that the produced certification is signed at the certification signing unit 145 by using the secret key of the certification issuing center device 140 (step 432), and the signed certification and the produced certification are sent to the key generation device 130.

When the certification and the signed certification are received, the key generation device 130 verifies whether the certification has been tampered on the communication path or not at the certification verification unit 138 (step 433). If this verification fails, the operation returns to the step 411 described above.

Then, the key generation device 130 takes the cryptosystem device 200 into itself, and the secret key generated at the secret key generation unit 135 is written into the secret key storage unit 201 of the cryptosystem device 200 at the secret key writing unit 139-1, while the certification verified at the certification verification unit 138 is written into the certification storage unit 202 of the cryptosystem device 200 at the certification writing unit 139-2 (step 434). Here, it should be noted that secret key disappears from the key generation device 130 when it is stored in the cryptosystem device 200, so that it is no longer remaining in the key generation device 130 at a time of processing the next cryptosystem device 200. In this manner, it becomes possible to prove that the secret key exists only within the cryptosystem device 200.

Finally, the authorized cryptosystem device 200' is ejected from the key generation device 130 (step 435), such that the user receives the authorized cryptosystem device 200' (step 440).

Note here that the secret key storage unit 201 of the cryptosystem device 200 stores the secret key such that no one can read out the secret key from there (although the processing result using the secret key is readable), and the secret key can be written into there only by means of the key generation unit 130 in order to prevent the tampering. In general, a user who is the owner of the secret key may be allowed to know the secret key, but the cryptosystem device 200 of this second embodiment is designed such that even an owner of this device cannot learn the value of the secret key stored therein, in consideration to the fact that once the secret key becomes known, there is a possibility for allowing the illegal digital copy of the digital data.

Also, the certification storage unit 202 of the cryptosystem device 200 is designed to store the certification such that the public key contained therein is readable, but the writing of the certification by anything other than the key generation device 130 is prohibited so as to prevent the tampering.

It is to be noted that the key generation device 130 has such a structure that no change in the secret key and the certification is allowed for anyone including an operator of the key generation device 130, once the cryptosystem device 200 is taken into the key generation device 130 for the purpose of writing the secret key and the certification.

It is also to be noted that the secret key and the certification are written into a single cryptosystem device 200 in the above, but it is also possible to write the secret key and the certification separately into two different cryptosystem devices.

In this second embodiment, it is possible to prove that the user is the only one who expressed the intention to pay, while it is also possible to prove that the user cannot copy the digital data without a permission from the information provider, just as in the first embodiment described above.

In other words, the secret key and the public key of the public key cryptosystem are produced in such a manner that the values of these public key and secret key cannot be known by anyone, including those who are involved in the key generation. Then the certification is produced from the public key and the personal data, and this certification is stored in the cryptosystem device such that it cannot be written by anyone, while this secret key is stored in such a manner that the value of this secret key cannot be read out and known by anyone, including the user.

Thus, according to this second embodiment, it also becomes possible to provide a method and a system for generation and management of a secret key of the public key cryptosystem, in which it is possible to prove that only a user can use the secret key which should not be known by anyone including a user, such that an illegal copy of digital data can be prevented and an infallible confirmation of a user's intention to pay can be made.

As a consequence, in a case of offering computer programs or digital speech/video data having copyrights for sales through networks in exchange to the payment of charges, even if there is a money trouble among the copyright owner, seller, and purchaser, it becomes possible to identify a person who committed the illegal act from a third person's viewpoint according to this second embodiment, so that it can also provide an effective measure against the illegal act.

Referring now to FIG. 7 to FIG. 12, the third embodiment of a method and a system for generation and management of a secret key of the public key cryptosystem according to the present invention will be described in detail. This third embodiment is directed to a case of reproducing (reviving) the secret key stored in the cryptosystem device as in the first or second embodiment described above, when the secret key disappeared or became unusable.

In this third embodiment, the cryptosystem device is provided in a form of a personal portable device such as a PC card, an IC card, etc., and an exemplary case in which the secret key stored in this personal portable device has disappeared will be described.

Figure 7:
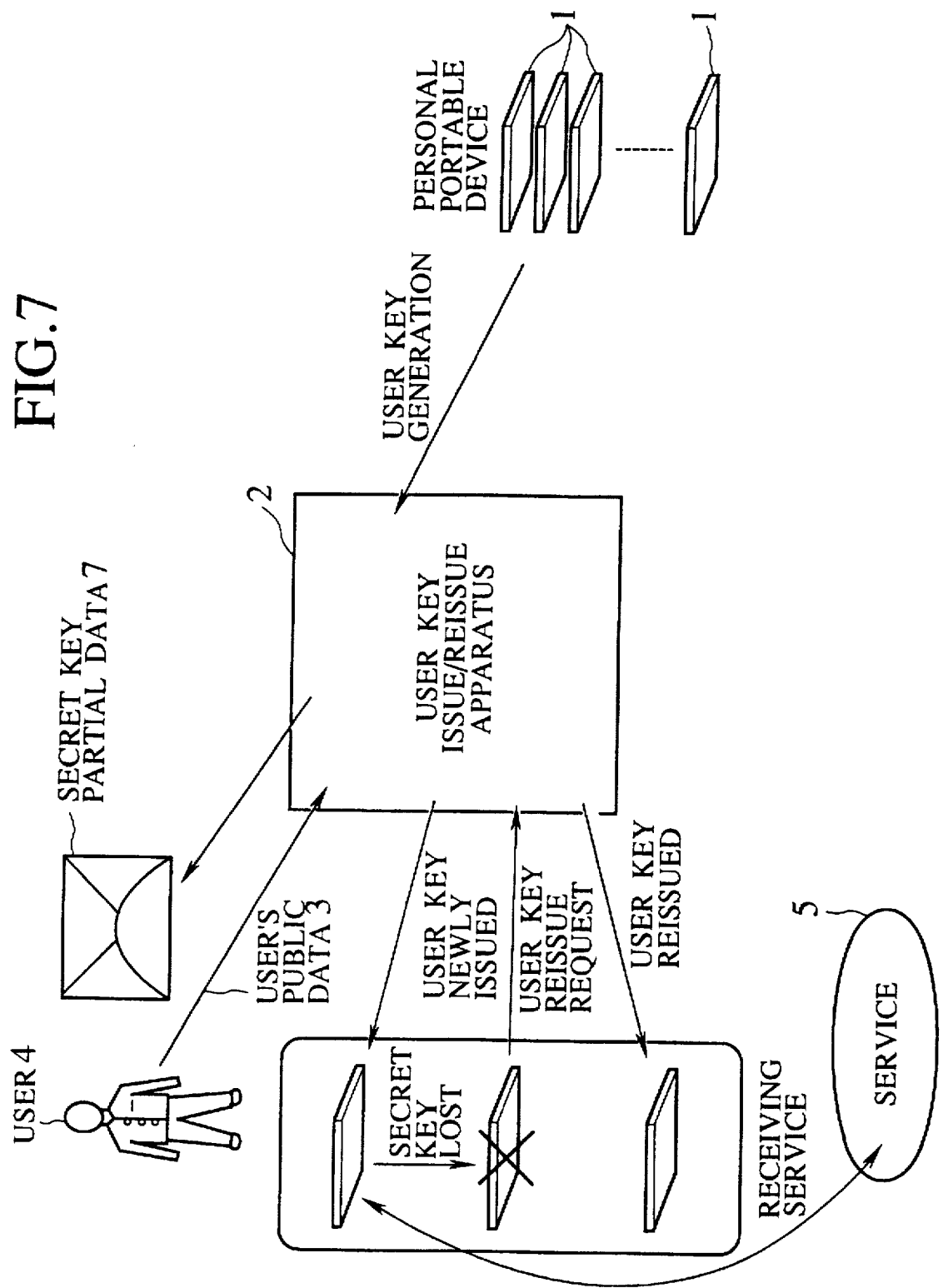
FIG. 7 is a diagram of a conceptual configuration of a system in the third embodiment of the present invention.

FIG. 7 shows a conceptual configuration of a system in this third embodiment, where a personal portable device 1 manufactured by a device manufacturing apparatus (not shown) is given to a user key issue/reissue apparatus 2, and in this user key issue/reissue apparatus 2, the secret key of the user is secretly written into the personal portable device 1 according to the user's public data 3, and the certification is written into the personal portable device 1 without a possibility for being tampered.

The individually customized personal portable device 1 is then delivered to a user 4, so that the user 4 can start receiving a service 5 by using this personal portable device 1.

Now, suppose that the secret key in the personal portable device 1 has disappeared by mistake of the user 4. For instance, in practice, the user's secret key is usually stored in a volatile memory in view of the security, so that when the battery of the personal portable device 1 is used up, the stored secret key can disappear and become unusable.

In such a situation, conventionally, the secret key becomes totally unusable, and all the information obtained from the service 5 received up until then and all the rights to receive the service 5 in future are lost. Also, even if the personal portable device 1 is reissued from the user key issue/reissue apparatus 2, it is impossible to prove the relationship between the newly issued personal portable device 1 and the previously used personal portable device 1. This is because if it is possible to prove the relationship between the lost secret key and the newly issued secret key, it would imply that it is possible for another person to pretend the legitimate user, so that it actually must be impossible to prove the relationship between the newly issued personal portable device 1 and the previously used personal portable device 1.

In contrast, in this third embodiment, the secret key can be reproduced by the procedure according to the flow chart of FIG. 8 as follows.

First, a necessary condition for the secret key reproduction is determined in advance (step S1). Then, the personal portable device 1 with the secret key stored therein is issued at the user key issue/reissue apparatus 2 (step S2), while secret key partial data 7 obtained by dividing the secret key are distributed among designated arbitrators who judges the appropriateness of the secret key reproduction (step S3).

When the personal portable device 1 is delivered, the user 4 can start receiving the service 5 (step S4).

When the secret key is lost (step S5), the secret key reproduction request is made by submitting the personal portable device 1 and collecting the secret key partial data 7 from those arbitrators who judged that the secret key reproduction is appropriate (step S6).

Then, whether the necessary condition for secret key reproduction is satisfied or not is judged (step S7), and if the necessary condition is satisfied, the user's secret key is reproduced from the collected secret key partial data 7 (step S8).

On the other hand, if the necessary condition is not satisfied as some arbitrators (organizations) refused to submit the secret key partial data 7 for some reasons such as a past illegal use record by this user 4, the reissue of the personal portable device 1 can be refused (step S9).

In this procedure, the secret key partial data 7 must satisfy the following conditions.

(1) Each secret key partial data 7 should contain only a part of the secret key that can be used to produce the secret key, and should not contain the secret key as a whole.

(2) Mutually different secret key partial data 7 are to be distributed among all those (arbitrators) who are involved in the authentication of the user 4 at a time of originally issuing the personal portable device 1, and to be managed subsequently in secrecy.

(3) Each arbitrator may learn the value of the secret key partial data 7 which is managed by this arbitrator.

(4) The calculation of the secret key from a number of secret key partial data 7 should have the same level of the cryptographic strength as in a case of guessing the secret key from the disclosed information on the public key. (This corresponds to the requirement that a conspiracy by some arbitrators is impossible.)

(5) When the secret key reproduction necessary condition determined in advance at a time of originally issuing the personal portable device 1 is satisfied, the secret key can be reproduced only in secrecy inside the user key issue/reissue apparatus 2 which is formed by a tamper resistant device.

Now, a manner of distributing the secret key partial data in this third embodiment will be described in further detail.

Note that the secret key partial data in this third embodiment is a part which constitutes the secret key, and when at least a prescribed number of the secret key partial data are collected, the secret key can be reproduced.

More specifically, the secret key partial data can be classified into the following three types (conditions).

(1) A type of secret key partial data without which the secret key cannot be reproduced. This type of secret key partial data makes up the secret key reproduction indispensable condition.

(2) A type of secret key partial data for which the secret key can be reproduced when k pieces out of total j pieces of secret key partial data are collected, where k<j is a prescribed threshold. This type of secret key partial data makes up the secret key reproduction threshold condition.

(3) A type of secret key partial data for which an order of collecting the secret key partial data is also specified, so that the secret key cannot be reproduced unless these secret key partial data are collected in the specified order. This type of secret key partial data makes up the secret key reproduction order condition.

In practice, any desired combination of these three conditions can be used as the secret key reproduction necessary condition.

As for the designation of the arbitrators to which the secret key partial data are to be distributed, it is important for the designated arbitrators to include every person or organization who shares interests with the user who wishes the secret key reproduction. This is because if there is an interested party who is left out, the secret key reproduction would appear as a conspiracy by the others from this interested party's point of view.

For example, the secret key reproduction necessary condition can be formed as illustrated in FIG. 9.

Namely, the owner (user) of the personal portable device in which the secret key became unusable is naturally expected to wish the secret key reproduction, so that the secret key partial data owned by the user should constitute the secret key reproduction indispensable condition 11. This is because otherwise the user's secret key could be reproduced at the other's will regardless of this user's will. The user is going to send this secret key partial data 7 owned by himself to the user key issue/reissue apparatus 2.

Next, upon receiving a request for the secret key reproduction from the user, the arbitrator such as a credit card company checks if there is any past utilization record of an illegal use at a time of receiving the service or a delay in payment of the charges by this user, by referring to the so called black list. This type of arbitrator is expected to approve the secret key reproduction as long as this user has no problematic record, so that the secret key partial data of this type of arbitrator should constitute the secret key reproduction order condition 12.

Next, when the approvals for the secret key reproduction by the service providers A, B, C, . . . , I constitute the secret key reproduction threshold conditions 13-1, 13-2, 13-3, 13-4, etc., which require that it is necessary to have the approval for the secret key reproduction from any one of the service providers A, B, C, . . . I, for example, the secret key partial data of one of these service providers A, B, C, . . . , I can constitute the secret key reproduction order condition 13. The service provider who approves the secret key reproduction is going to send the secret key partial data managed by this service provider to the user key issue/reissue apparatus 2.

Also, when the approvals for the secret key reproduction by the user key issue/reissue apparatus managers A, B, C, . . . , J constitute the secret key reproduction threshold conditions 14-1, 14-2, 14-3, 14-4, etc., which require that it is necessary to have the approval for the secret key reproduction from any two of the user key issue/reissue apparatus managers A, B, C, . . . , J, for example, the secret key partial data of two of these user key issue/reissue apparatus managers A, B, C . . . , J can constitute the secret key reproduction order condition 14. The user key issue/reissue apparatus managers who approve the secret key reproduction are going to send the secret key partial data managed by them to the user key issue/reissue apparatus 2.

Finally, it is also necessary to make a record as to who have approved the secret key reproduction, in order to deal with a case in which someone objects to the secret key reproduction later on, so that a list of secret key reproduction approved persons (including a person who produced this list) should constitutes the secret key reproduction order condition 15, and this person who produced this list is going to send this list to the user key issue/reissue apparatus 2.

Note here that it is preferable to encipher the secret key partial data by the secret key cryptosystem or the public key cryptosystem, because otherwise there is a high probability for being able to reproduce the secret key of the user by wiretapping all the secret key partial data related to the user.

When all the secret key reproduction indispensable condition, the secret key reproduction threshold condition, and the secret key reproduction order condition on the secret key partial data as described above are satisfied, the secret key can be reproduced by using the collected secret key partial data.

Figure 10:
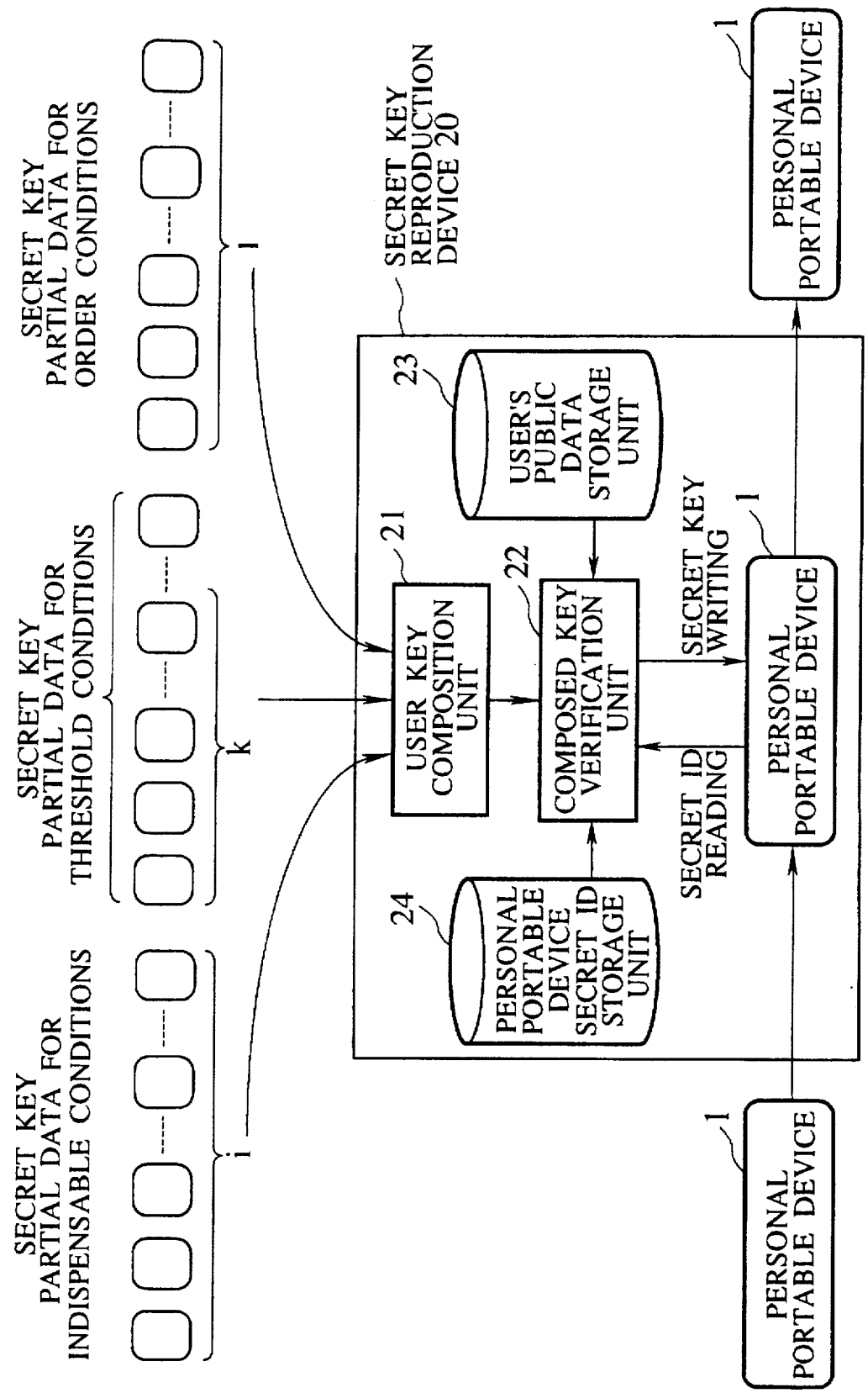
FIG. 10 is a block diagram of an exemplary configuration of a secret key reproduction device in the third embodiment of the present invention.

FIG. 10 shows an exemplary configuration of a secret key reproduction device 20 which is to be provided inside the user key issue/reissue apparatus 2. This secret key reproduction device 20 itself is formed by a tamper resistant device, and includes a user key composition unit 21, a composed key verification unit 22 connected with the user key composition unit 21, a user's public data storage unit 23 connected with the composed key verification unit 22, and a personal portable device secret ID storage unit 24 connected with the composed key verification unit 22.

In this secret key reproduction device 20, when the secret key reproduction necessary condition is satisfied, the user's secret key is composed from the collected secret key partial data of the satisfied indispensable conditions, threshold conditions, and order conditions at the user key composition unit 21. Then, at the composed key verification unit 22, whether the composed secret key is consistent with the public key that has been used by the user or not is checked.

Here, the checking can be done as follows. A random number is generated, and this random number is enciphered by the public key stored in the user's public data storage unit 23. Then, the enciphered random number is deciphered by the reproduced secret key, and if the deciphered result coincides with the original random number, it can be ascertained that the public key and the reproduced secret key are consistent. By repeating this checking for several times, the reliability can be raised to a practically sufficient level. When this checking indicates that the reproduced secret key is inconsistent with the public key, it is 100% sure that either the condition for approving the secret key reproduction is actually not satisfied, or someone is committing the illegal act.

In addition, in order to prevent the erroneous reissue of more than one sets of the same personal portable device 1, the composed key verification unit 22 matches the device secret ID stored in the personal portable device secret ID storage unit 24 and the secret ID read out from the personal portable device 1, and when they are consistent, the reproduced secret key is actually written into the personal portable device 1.

Now, the concrete example of how to set up the secret key reproduction indispensable conditions, the secret key reproduction threshold conditions, and the secret key reproduction order conditions in this third embodiment will be described.

(1) Secret key reproduction indispensable conditions:

Suppose that a key k to be reproduced can be expressed as:

$$k = f(k_1) \bigcirc f(k_2) \bigcirc f(k_3) \bigcirc \ldots \bigcirc f(k_i) \bigcirc \ldots \bigcirc f(k_n)$$

where $\bigcirc$ is an operator. Here, the operator $\bigcirc$ and the function f are required to satisfy the following conditions:

(a) The commutative law holds; and (b) It is sufficiently difficult to learn k even when all but $k_i$ are known.

For example, the following definition of the key k can satisfy these conditions:

$$k = \alpha \exp(k_1 \cdot k_2 \cdot k_3 \ldots k_i \ldots k_n) \bmod p$$

where p is a prime number in a magnitude over 600 bits or so, and $\alpha$ is a primitive root of p.

(2) Secret key reproduction threshold conditions:

When it suffices for k out of n persons to approve the secret key reproduction, this can be expressed by the k-th order simultaneous congruence equations regarding residues for all n persons as follows.

$$y \equiv x_1{}^a \bmod q_1 \cdot q_2 \cdots q_i \cdots q_n$$

$$y \equiv x_2{}^a \bmod q_1 \cdot q_2 \cdots q_i \cdots q_n$$

$$\vdots$$

$$y \equiv x_i{}^a \bmod q_1 \cdot q_2 \cdots q_i \cdots q_n$$

$$\vdots$$

$$y \equiv x_n{}^a \bmod q_1 \cdot q_2 \cdots q_i \cdots q_n$$

where each $q_i$ is a prime number in a magnitude over 300 bits or so, such that $q_1 q_2 \ldots q_i \ldots q_n$ is in a magnitude over 600 bits or so. Also, there is no particular reason to disclose a and y, so that a and y are preserved as the personal data either possessed by the user or stored within the secret key reproduction device. $x_i$ are to be distributed in secrecy. When more than k sets of the congruence equations in the above simultaneous congruence equations are collected, it is possible to solve them by using the Chinese remainder theorem.

(3) Secret key reproduction order conditions:

Here, the only reason to consider the order is to see if the secret key reproduction has been approved prior to each person. Therefore, it suffices to check the signature of the person who approved the secret key reproduction. When the approval is forged by a certain person even though a person who should approve the secret key reproduction prior to this certain person has actually not approved the secret key reproduction, it is possible to make a deception at that point, but a correct value cannot be composed at a time of composing the secret key within the secret key reproduction device.

In this manner, according to this third embodiment, it is possible to provide a method and a system for generation and management of a secret key of the public key cryptosystem, in which the secret key which should not be known by anyone including a user can be reproduced (revived) even when the secret key disappeared, so that it is possible to eliminate a situation in which the user loses accesses to all the enciphered information acquired by the user up until then. In particular, the characteristic feature of this third embodiment is that there is no difference before and after the secret key reproduction in terms of the security.

Up to this point, the third embodiment has been described for an exemplary case i which the secret key disappeared from the personal portable device 1. However, in practice, when many users use the personal portable devices for various purposes, there can be many cases in which the personal portable device 1 itself is destroyed as it is dropped or stamped by accident.

When the personal portable device 1 itself is destroyed (that is, when it becomes impossible for the personal portable device 1 to function as originally designed), it is necessary to reissue the personal portable device 1 itself. Note that this method is also effective when the enciphered information acquired by the user is stored in the volatile memory within the personal portable device 1.

Now, a modification of the third embodiment for a case in which the personal portable device 1 storing the secret key is destroyed will be described.

Figure 8:
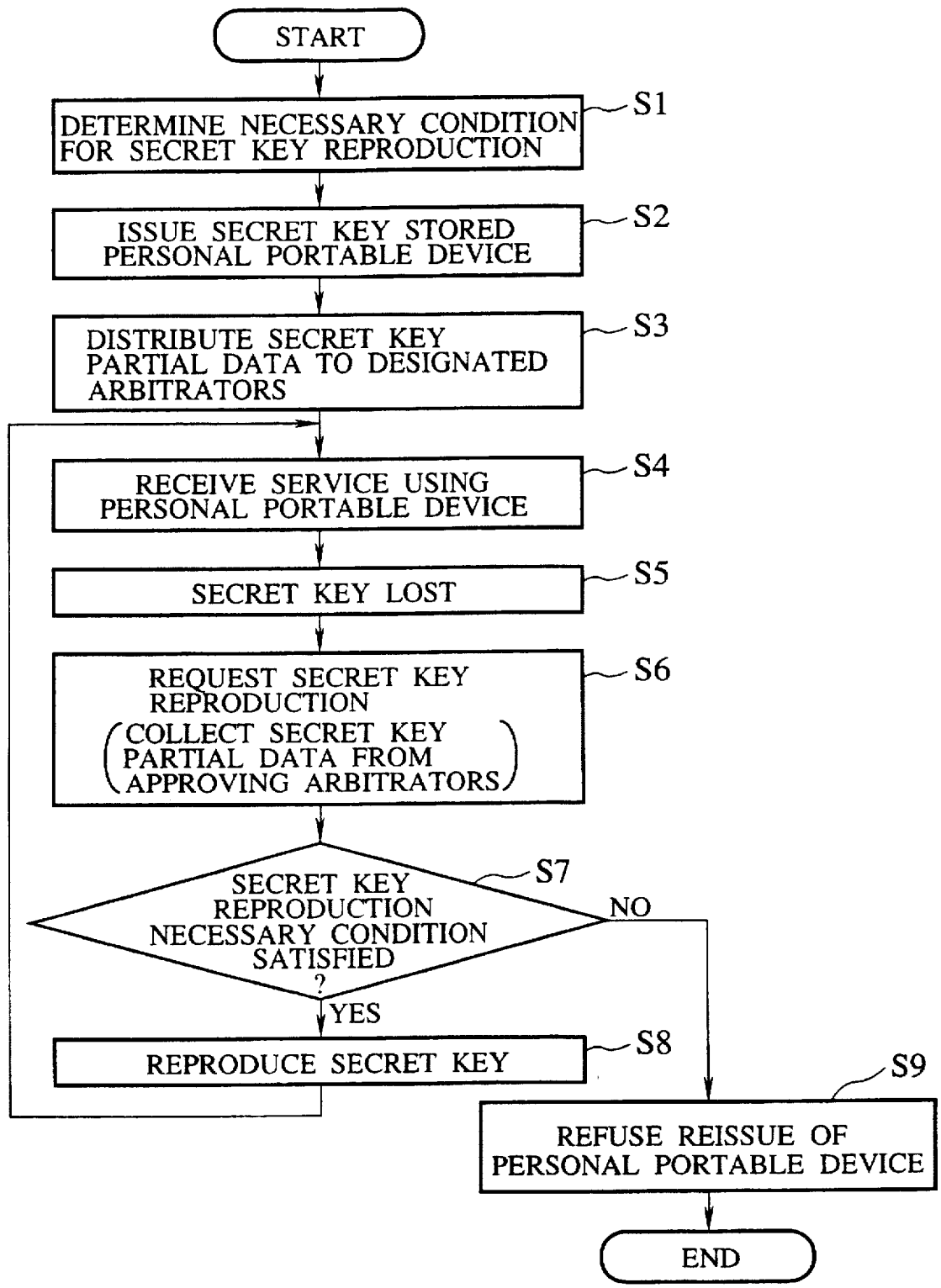
FIG. 8 is a flow chart for a procedure to reproduce the secret key in the system of FIG. 7.
Figure 11:
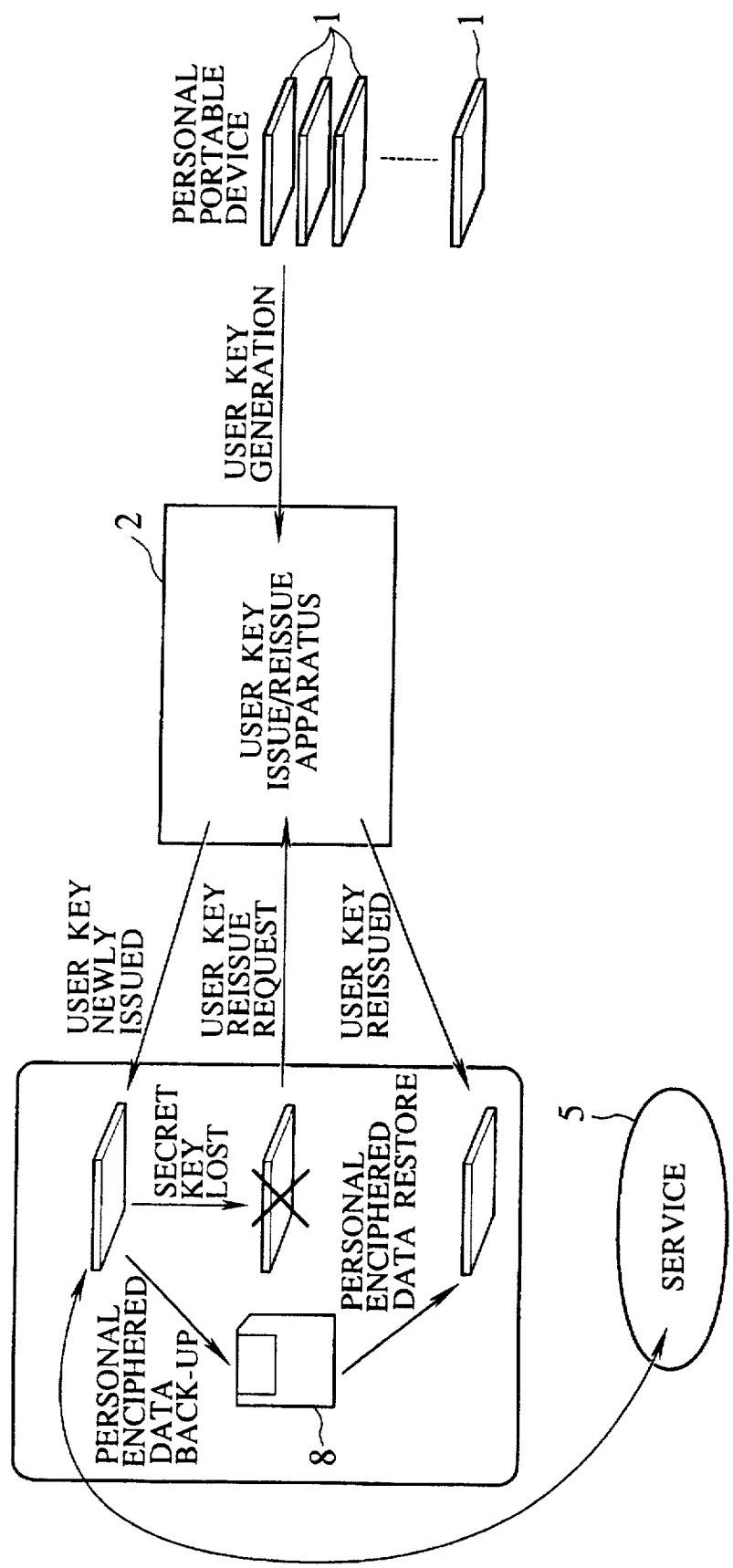
FIG. 11 is a diagram of a conceptual configuration of a system in one modification of the third embodiment of the present invention.
Figure 12:
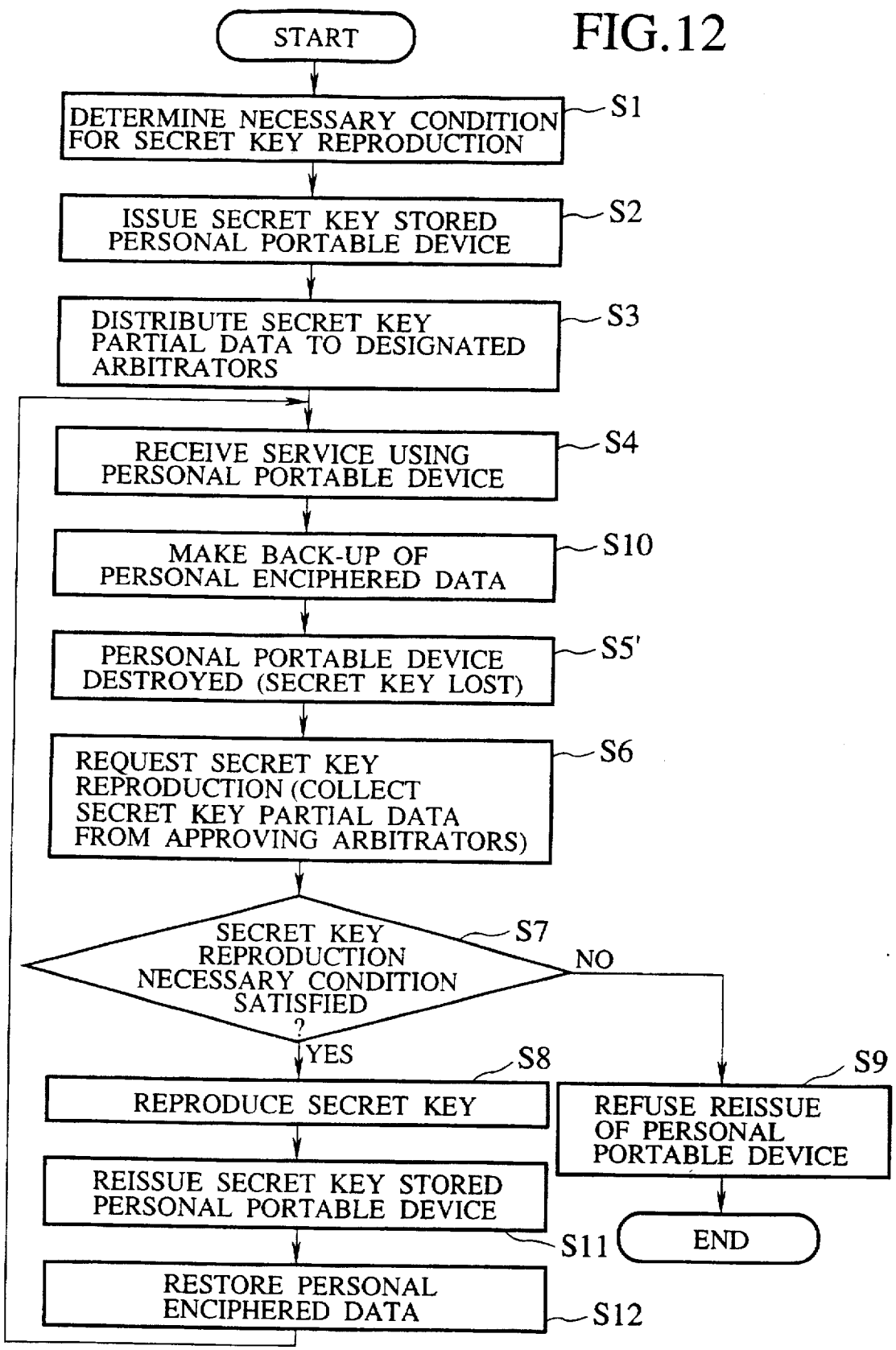
FIG. 12 is a flow chart for a procedure to reproduce the secret key in one modification of the third embodiment of the present invention.

FIG. 11 shows a conceptual configuration of a system in this modified third embodiment, and FIG. 12 shows a flow chart for the procedure to reproduce the secret key, for a case in which the personal portable device 1 storing the secret key is destroyed, where elements and steps similar to corresponding ones in FIG. 7 and FIG. 8 described above are given the same reference numerals in the figures.

This modified third embodiment differs from the third embodiment described above in that the user makes a back-up of the personal enciphered data in a back-up disk device 8 according to the user's frequency to use the personal portable device 1, so as not to lose all 0.0 mm 0.0 mey o information acquired by the user (step S10 after the step S4 in FIG. 12), and then, when the secret key stored personal portable device 1 is destroyed (step S5' in FIG. 12) and the secret key reproduction necessary condition is satisfied, the secret key stored personal portable device 1 is reissued (step S11 after the step S8), and the personal enciphered data are restored (step S12 after the step S11 in FIG. 12).

This modified third embodiment also differs from the third embodiment described above in that the device secret ID stored in the personal portable device secret ID storage unit 24 is handled differently. Namely, in a case of reissuing the device, the device secret ID of the device to be reissued is naturally different from the device secret ID stored in the personal portable device secret ID storage unit 24, so that the reproduced secret key cannot be written into the device to be reissued immediately, and it is necessary for the personal portable device secret ID storage unit 24 to update the registered device secret ID to that of the device to be reissued.

According to this modified third embodiment, it is possible to provide a method and a system for generation and management of a secret key of the public key cryptosystem, in which the secret key which should not be known by anyone including a user can be reproduced (revived) and the personal enciphered information can be restored even when the secret key became unusable as the personal portable device is destroyed, so that it is possible to eliminate a situation in which the user loses accesses to all the enciphered information acquired by the user up until then. Also, similarly as in the third embodiment described above, there is no difference before and after the secret key reproduction in terms of the security.

It should be apparent that this third embodiment and its modification are equally applicable to a case of using the secret key cryptosystem as well.

Referring now to FIG. 13 to FIG. 16, the fourth embodiment of a method and a system for generation and management of a secret key of the public key cryptosystem according to the present invention will be described in detail. In the first to third embodiments described above, a use of a specialized tamper resistant device for writing the user's secret key into the personal portable device is required. In contrast, this fourth embodiment is directed to a method and a system for generation and management of a secret key of the public key cryptosystem, in which the secret key of the public key cryptosystem can be generated within the personal portable device, so that no specialized device for writing the secret key is required.

Figure 13:
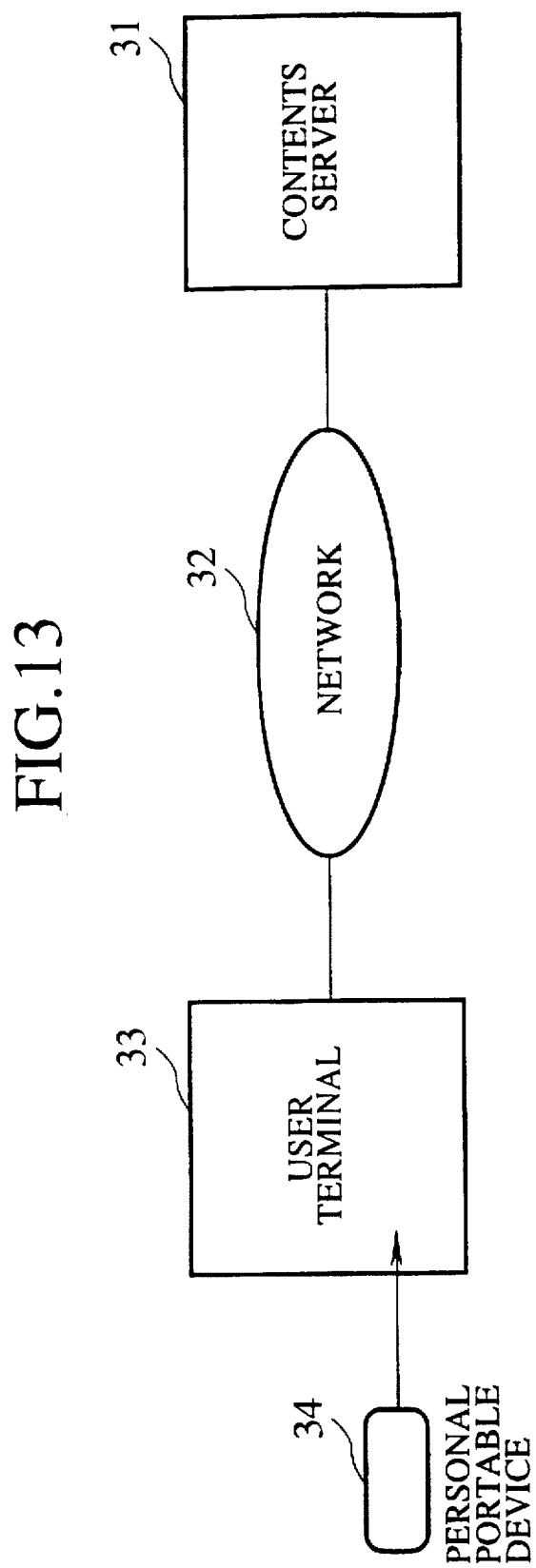
FIG. 13 is a diagram of a conceptual configuration of a system in the fourth embodiment of the present invention.

FIG. 13 shows a conceptual configuration of a system in this fourth embodiment, which includes a personal portable device 34 used on a user terminal 33, and a contents server 31 connected with the user terminal 33 through a network 32.

The contents server 31 provides a service. A user who wish to receive this service inserts the personal portable device 34 into the user terminal 33, and operates this user terminal 33 such that the desired contents are distributed from the contents server 31 through the network 32 to the user terminal 33.

Figure 14:
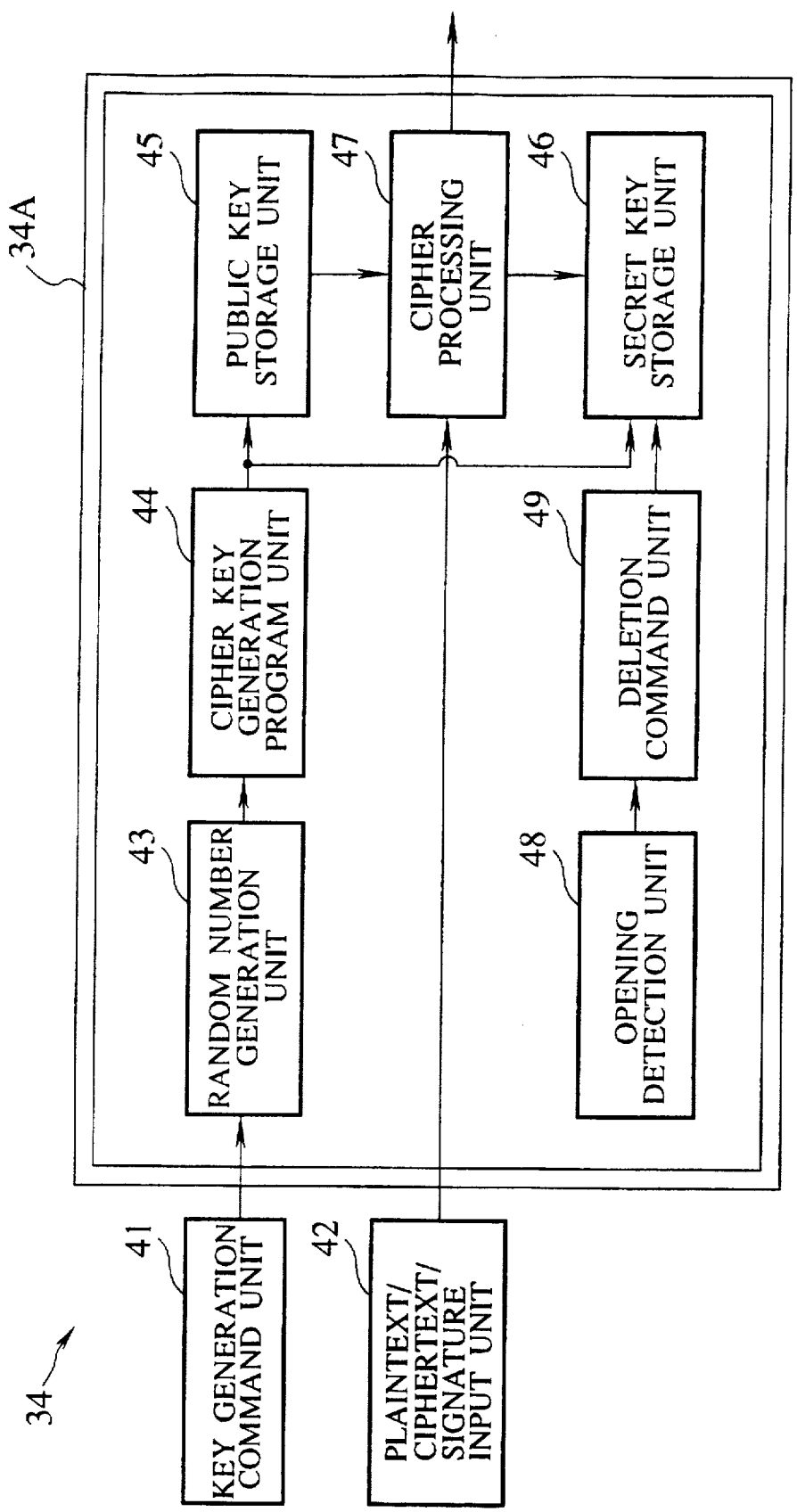
FIG. 14 is a block diagram of a personal portable device in the fourth embodiment of the present invention.

The personal portable device 34 has a detailed configuration as shown in FIG. 14, which comprises a key generation command unit 41, a plaintext/ciphertext/signature input unit 42, a random number generation unit 43 connected with the key generation command unit 41, a cipher key generation program unit 44 connected with the random number generation unit 43, a public key storage unit 45 connected with the cipher key generation program unit 44, a cipher processing unit 47 connected with the plaintext/ciphertext/signature input unit 42 and the public key storage unit 45, a secret key storage unit 46 connected with the cipher key generation program unit 44 and the cipher processing unit 47, a deletion command unit 49 connected with the secret key storage unit 46, and a opening detection unit 48 connected with the deletion command unit 49.

In this configuration of FIG. 14, elements other than the key generation command unit 41 and the plaintext/ciphertext/signature input unit 42 are enclosed within a tamper resistant device 34A whose interior cannot be touched by anyone. Whenever an attempt to read out the secret key of the RSA cryptosystem stored inside this tamper resistant device 34A is made by forcefully opening a cover of this tamper resistant device 34A, the opening detection unit 48 detects the opening of the cover and the deletion command unit 49 is activated to electrically delete the secret key stored in the secret key storage unit 46, so that the secret key cannot be read out, even by an owner of this personal portable device 34. Also, in order to prevent the rewriting of the secret key to a different key, this tamper resistant device 34A is designed to destroy semiconductor chips and substrate wirings used inside this tamper resistant device 34A whenever the cover is opened. An example of this type of tamper resistant device is disclosed in S. H. Weingard, "Physical Security for the μASBYSS System", Proceedings 1987 IEEE Symposium on Security and Privacy, pp. 52–58, April 1987.

This personal portable device 34 of FIG. 14 has two inputs and one output. One of the inputs is the key generation command unit 41 for commanding a generation of a public key and a secret key of the RSA cryptosystem to be used by the user, which is operated by the user before the user starts receiving the service by using this personal portable device 34.

Here, for example, a command entered by this key generation command unit 41 can be a seed of a random number to be generated at the random number generation unit 43. In this case, it is preferable to generates this seed such that the same seed is almost never generated again. For instance, it is practical to utilize the input characters of the keyboard input and their input time intervals. From the entered seed, a random number is generated at the random number generation unit 43, and this random number is given to the cipher key generation program unit 44.

The cipher key generation program unit 44 then generates the keys of the RSA cryptosystem. Among the keys of the RSA cryptosystem generated at the cipher key generation program unit 44, the public key must be disclosed to public, so that the public key is stored in the public key storage unit 45 which is readable from the external. On the other hand, the secret key is stored in the secret key storage unit 46 which is not readable from the external. This completes the preparation of the keys to be used inside the personal portable device 34.

At a time of receiving the service, parameters required in enciphering a plaintext, deciphering a ciphertext, signing or verifying a signature are entered from another one of the inputs provided by the plaintext/ciphertext/signature input unit 42. For the enciphering of the entered plaintext and the verification of the signature, the public key disclosed by a communication target side is used. For the deciphering of the ciphertext, the secret key stored in the secret key storage unit 46 is used in the processing at the cipher processing unit 47, and the deciphered result is outputted from the cipher processing unit 47.

The secret key of the RSA cryptosystem generated in this manner is such that anyone can be convinced that only the owner of this personal portable device 34 can use this secret key, and that the value of this secret key itself cannot be known by anyone including the owner of this personal portable device 34.

In other words, according to this fourth embodiment, it is possible to utilize the authentication function for the purpose of confirming a legitimate user, and even a user who purchased the digital copyrighted data cannot make illegal copies. Moreover, the secret key used in the personal portable device 34 can be generated without requiring a use of a specialized device for writing the secret key into the personal portable device 34.

Note that, in practice, the personal portable device 34 can be provided easily in a form of a standardized IC card or PC card (PCMCIA).

As for the method for actually utilizing the contents deciphered at the receiving side, those disclosed in Japanese Patent Application No. 6-298702 (1994) and Japanese Patent Application No. 6-299940 (1994) are available.

It is also to be noted that the key generation command unit 41 and the plaintext/ciphertext/signature input unit 42 may be provided on the user terminal 33 side into which the personal portable device 34 is to be inserted, or the user terminal 33 and the personal portable device 34 may be integrally provided, if desired.

Figure 15:
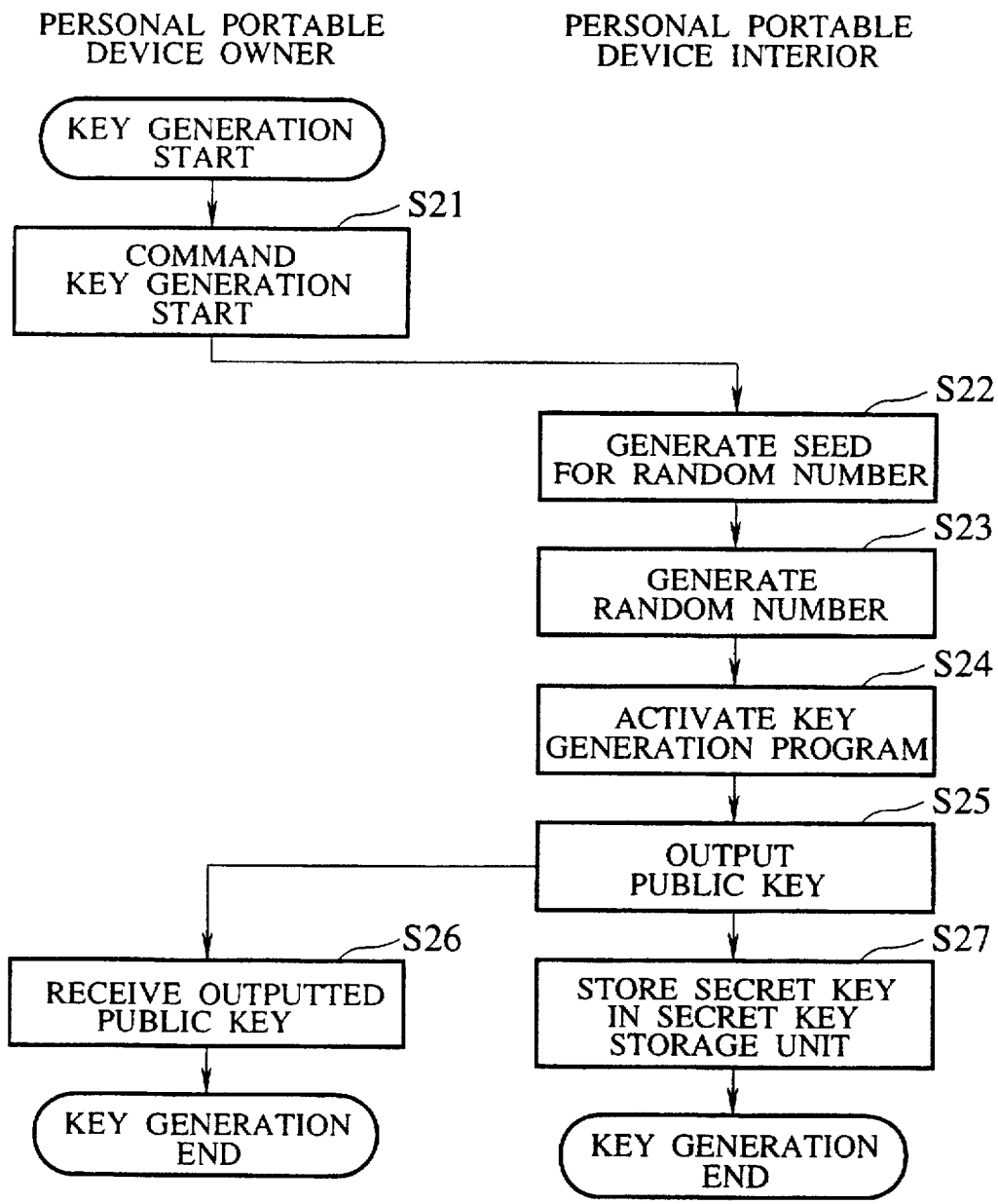
FIG. 15 is a flow chart for a key generation procedure in the fourth embodiment of the present invention.

In this personal portable device 34 of FIG. 14, the key generation is carried out by a procedure according to the flow chart of FIG. 15 as follows.

First, the owner of the personal portable device 34 commands the key generation start (step S21). Upon this command, the key generation command unit 41 generates a seed for a random number (step S22), and the random number generation unit 43 generates a random number by using this seed (step S23). Then, the key generation program is activated at the cipher key generation program unit 44 (step S24) to generate the keys.

Among the generated keys, the public key must be distributed to the communication target parties, so that the public key is outputted from the personal portable device 34 via the cipher processing unit 47 (step S25) while being stored in the public key storage unit 45. The outputted public key is then received by the owner of the personal portable device 34 (step S26), and if necessary, registered at the certification issuing organization and distributed to the communicating target parties after it is approved by the certification issuing organization.

On the other hand, the generated secret key is stored in the secret key storage unit 46 of the personal portable device 34 (step S27), and the key generation is completed.

Figure 16:
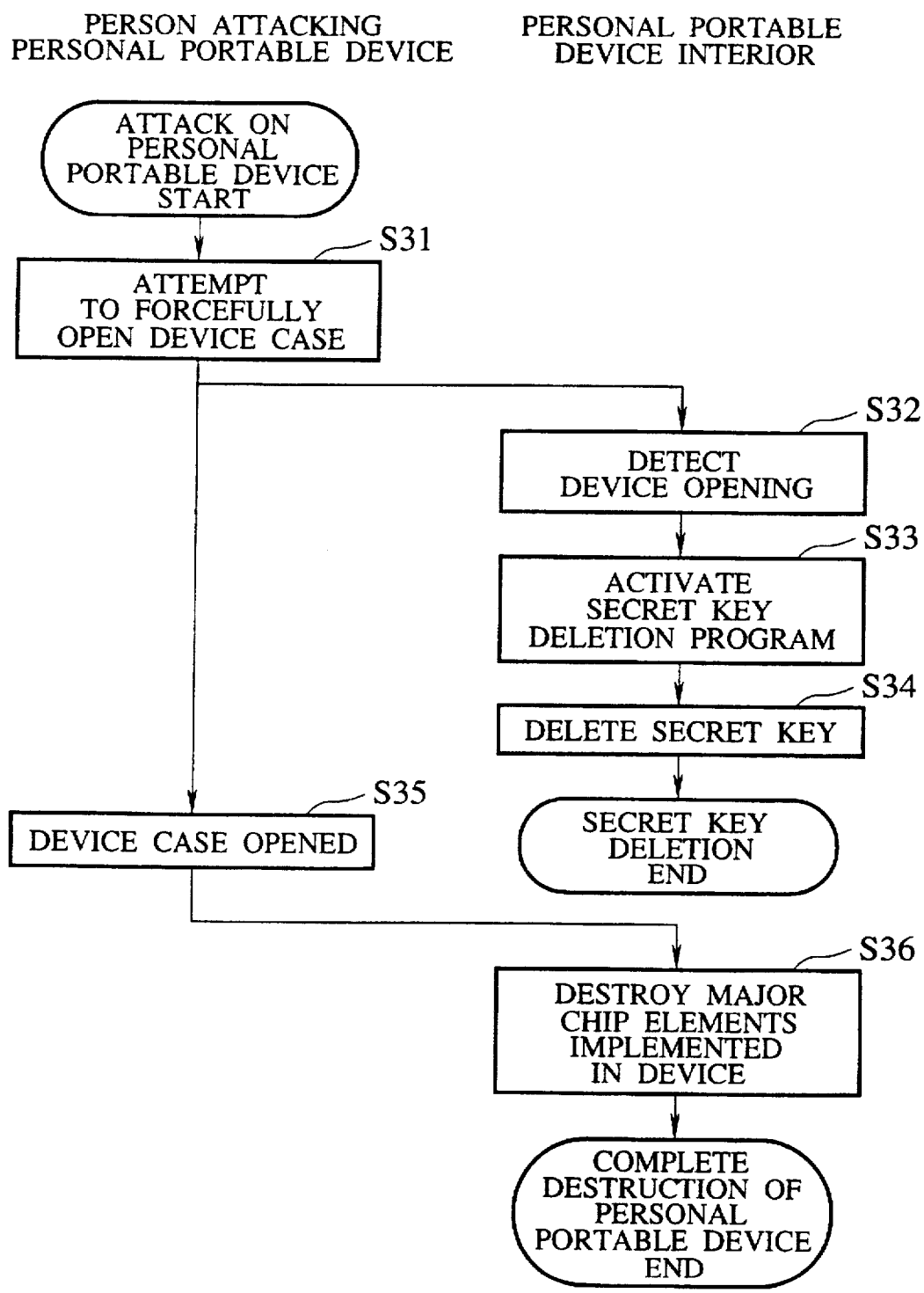
FIG. 16 is a flow chart for a secret key deletion procedure in the fourth embodiment of the present invention.

Also, in this personal portable device 34 of FIG. 14, the secret key deletion is carried out by a procedure according to the flow chart of FIG. 16 as follows.

Here, suppose that there is a person who tries to attack the personal portable device 34 in order to take out the secret information stored inside the personal portable device 34, where this person may be the owner of this personal portable device 34. In this case, the first thing this person might consider is to somehow take out some secret information from an interface between the personal portable device 34 and the user terminal 33. However, no secret information can be obtained in this manner for an obvious reason that only information which can be publicly disclosed will be outputted from the personal portable device 34. When this person is still not discouraged by this result, next this person might tries to forcefully open the personal portable device 34 in an attempt to take out the secret information.

Whenever there is an attempt to forcefully open the device case (step S31), the opening detection unit 48 detects this opening of the device (step S32), and the deletion command unit 49 activates the secret key deletion program (step S33) so that the secret key is deleted from the secret key storage unit 46 (step S34).

In addition, when the personal portable device 34 is forcefully opened (step S35), the major chip elements implemented in the interior of the personal portable device 34 are destroyed (step S36), so that it becomes impossible to take out any information.

In this manner, it is totally impossible for anyone to take out any secret information from the personal portable device 34 of the fourth embodiment.

Thus according to this fourth embodiment, it is possible to provide a method and a system for generation and management of a secret key of the public key cryptosystem, in which the secret key of the public key cryptosystem can be generated and managed within a personal portable device, without requiring a specialized device for writing the secret key into a personal portable device.

By using the personal portable device of this fourth embodiment, in a case of handling the digital data as commercial goods on networks, it becomes possible to prove that the user is the only one who expressed the intention to pay, and that the user cannot copy the digital data without a permission from the information provider.

Referring now to FIG. 17 to FIG. 21, the fifth embodiment of a method and a system for generation and management of a secret key of the public key cryptosystem according to the present invention will be described in detail. This fifth embodiment is directed to a case in which it is also possible to reproduce (revive) the secret key stored in a personal portable device similar to that of the fourth embodiment described above, without requiring a specialized device for writing the secret key into a personal portable device as used in the third embodiment described above, even when the secret key disappeared or became unusable.

Figure 17:
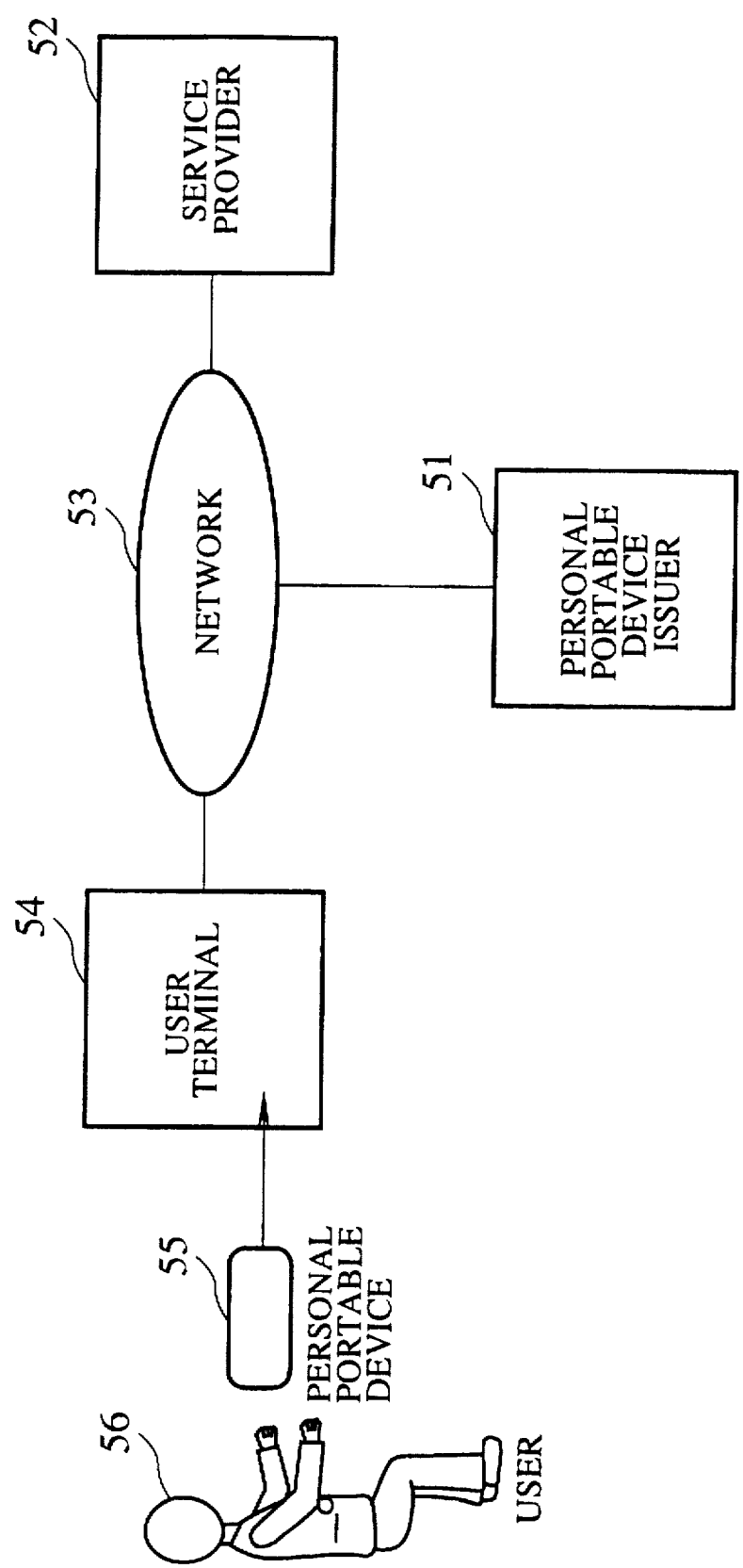
FIG. 17 is a diagram of a conceptual configuration of a system in the fifth embodiment of the present invention.

FIG. 17 shows a conceptual configuration of a system in this fifth embodiment, which includes a personal portable device 55 of a user 56 used on a user terminal 54, and a service provider 52 and a personal portable device issuer 51 connected with the user terminal 54 through a network 53.

In this configuration of FIG. 17, the user 56 who wishes to receive the service provided by the service provider 52 inserts his own personal portable device 55 into the user terminal 54, and operates the user terminal 54 such that the desired contents are distributed from the service provider 52 through the network 53 to the user terminal 54.

In this fifth embodiment, a number of parties involved in the key generation for the personal portable device 55 is arbitrary in general. In the following, a simplest exemplary case as shown in FIG. 17 in which three parties of the service provider 52, the user 56, a personal portable device issuer 51 are involved in the key generation will be described. It is to be noted however that, in practicing this fifth embodiment, it is preferable for all entities (persons or organization) who are sharing (or expected to be sharing) interests with the user to participate in the key generation when the user receives the service.

In this fifth embodiment, at a time of issuing the personal portable device 55, the secret key of the public key cryptosystem to be used in the personal portable device 55 can be generated in such a state that this secret key itself is not known by anyone including a manager of the service provider 52 and an owner (user) of the personal portable device 55, and it is possible to prove that this secret key is only existing inside this personal portable device 55. Moreover, this secret key stored in the personal portable device 55 can be reproduced (revived) even when the personal portable device 55 is lost or destroyed.

Figure 18:
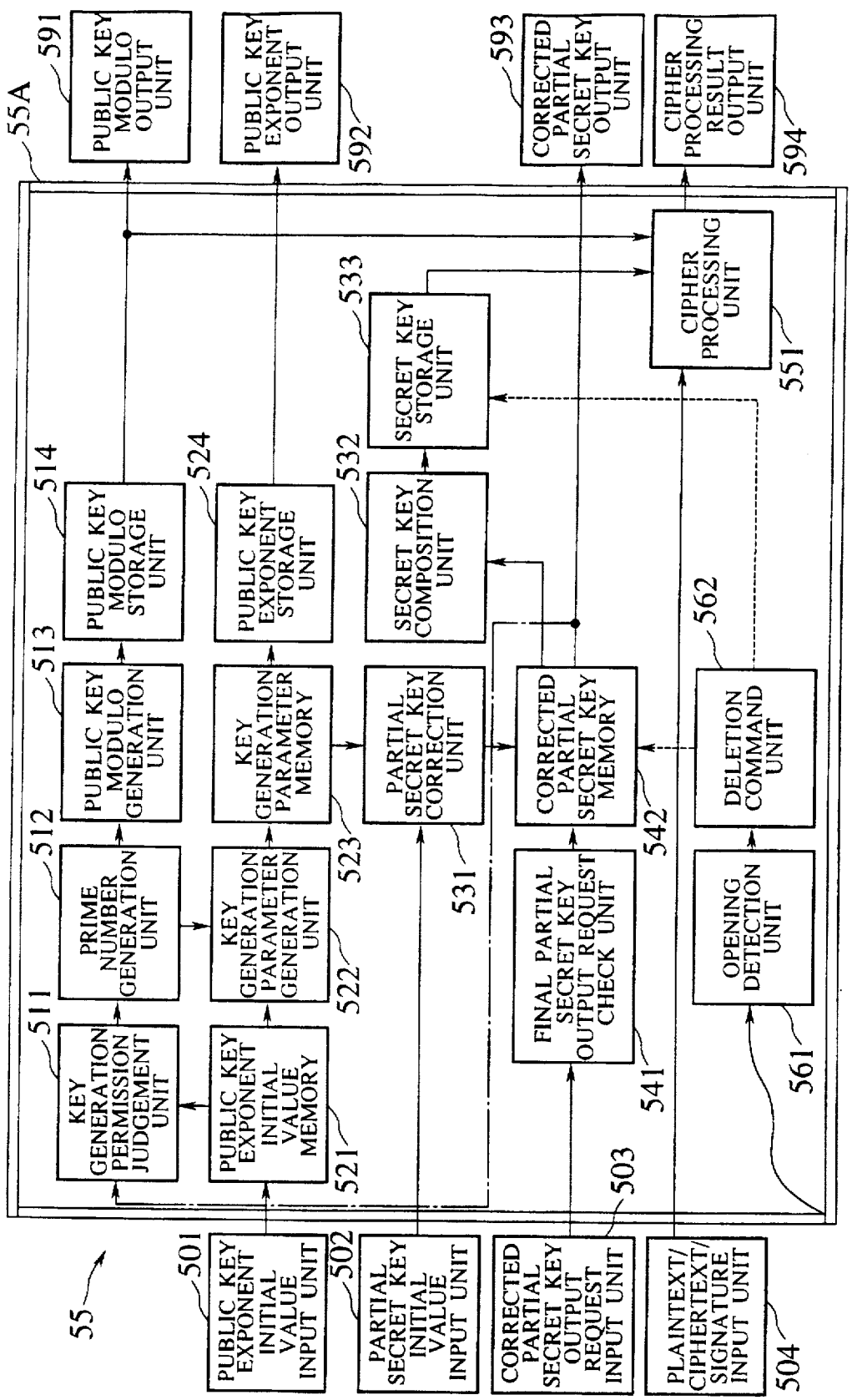
FIG. 18 is a block diagram of a personal portable device in the fifth embodiment of the present invention.

The personal portable device 55 of this fifth embodiment has a detailed configuration as shown in FIG. 18.

This personal portable device 55 of FIG. 18 includes a public key exponent initial value input unit 501, a partial secret key initial value input unit 502, a corrected partial secret key output request input unit 503, and a plaintext/ciphertext/signature input unit 504, which provide inputs into a tamper resistant device section 55A of this personal portable device 55.

This personal portable device 55 of FIG. 18 also includes a public key modulo output unit 591, a public key exponent output unit 592, a corrected partial secret key output unit 593, and a cipher processing result output unit 594, which provide outputs from the tamper resistant device section 55A of this personal portable device 55.

The tamper resistant device section 55A is formed by a tamper resistant device whose interior cannot be touched by anyone.

The tamper resistant device section 55A includes: a public key exponent initial value memory 521 connected with the public key exponent initial value input unit 501; a key generation parameter generation unit 522 connected with the public key exponent initial value memory 521; a key generation parameter memory 523 connected with the key generation parameter generation unit 522; and a public key exponent storage unit 524 connected with the key generation parameter memory 523 and the public key exponent output unit 592.

The tamper resistant device section 55A also includes: a key generation permission judgement unit 511 connected with the public key exponent initial value memory 521; a prime number generation unit 512 connected with the key generation permission judgement unit 511 and the key generation parameter generation unit 522; a public key generation unit 513 connected with the prime number generation unit 512; and a public key modulo storage unit 514 connected with the public key generation unit 513 and the public key modulo output unit 591.

The tamper resistant device section 55A also includes: a partial secret key correction unit 531 connected with the partial secret key initial value input unit 502; a secret key composition unit 532; and a secret key storage unit 533 connected with the secret key composition unit 532.

The tamper resistant device section 55A also includes: a final partial secret key output request check unit 541 connected with the corrected partial secret key output request input unit 503; and a corrected partial secret key memory 542 connected with the final partial secret key output request check unit 541, the partial secret key correction unit 531, the secret key composition unit 532, the key generation permission judgement unit 511, and the corrected partial secret key output unit 593.

The tamper resistant device section 55A also includes: a cipher processing unit 551 connected with the plaintext/ciphertext/signature input unit 504, the public key modulo storage unit 514, the secret key storage unit 533, and the cipher processing result output unit 594; an opening detection unit 561, and a deletion command unit 562 connected with the opening detection unit 561, the corrected partial secret key memory 542, and the secret key storage unit 533.

In this configuration of FIG. 18, whenever an attempt to read out the secret key of the RSA cryptosystem stored inside this tamper resistant device section 55A is made by forcefully opening a cover of this tamper resistant device section 55A, the opening detection unit 561 detects the opening of the cover and the deletion command unit 562 is activated to electrically delete the secret key stored in the secret key storage unit 533, so that the secret key cannot be read out, even by an owner of this personal portable device 55. Also, in order to prevent the rewriting of the secret key to a different key, this tamper resistant device 55 is designed to destroy semiconductor chips and substrate wirings used inside this tamper resistant device section 55A whenever the cover is opened. An example of this type of tamper resistant device is disclosed in S. H. Weingard, "Physical Security for the μASBYSS System", Proceedings 1987 IEEE Symposium on Security and Privacy, pp. 52–58, April 1987.

Now, the key generation procedure used in this fifth embodiment will be described in detail.

First, the general procedure for generating the public key (public key exponent e, public key modulo n) and the secret key (secret key exponent d) used in the RSA cryptosystem will be briefly described.

Namely, the keys of the RSA cryptosystem are usually generated by the following steps (1) to (5).

(1) Generate two prime numbers p and q.

(2) Set a product of two generated prime numbers p and q as a public key modulo n of the public key.

(3) Let the least common denominator of (p−1) and (q−1) be L.

(4) Select a positive integer which is less than L and relatively prime with respect to L, and set this positive integer as a public key exponent e of the public key.

(5) Generate a secret key exponent d of the secret key for which $e \cdot d \equiv 1 \pmod{L}$.

On the other hand, the key generation procedure used in this fifth embodiment utilizes the fact that the secret key can be divided into partial secret keys.

In the key generation procedure used in this fifth embodiment, the same steps (1) to (4) as described above are followed by the following steps (5') and (5") instead of the above step (5).

(5') Select k−1 pieces of positive integers, each of which is less than L and relatively prime with respect to L, and set these positive integers as secret parameters $d_1, d_2, \ldots, d_{k-1}$, where k is a required number of secret parameters, i.e., a number of parties involved in the key generation.

(5") Generate a secret parameter $d_0$ which satisfies:

$$e \cdot d_0 \cdot d_1 \cdot d_2 \cdots d_{k-1} \equiv 1 \pmod{L}$$

and then generate the secret key d which satisfies:

$$x^d \equiv x^{d_0 \cdot d_1 \cdot d_2 \cdots d_{k-1}} \pmod{n}$$

where n is the public key modulo and x is an arbitrary positive integer less than n.

Here, it is easier to consider the divided secret parameters $d_0, d_1, d_2, \ldots, d_{k-1}$ as parts dividing the secret key d. Also, even when all the divided secret parameters other than $d_i$ are known, as much computational power as needed in breaking the RSA cryptosystem will be required in order to obtain $d_i$. Consequently, unless all the divided secret parameters $d_0, d_1, d_2, \ldots, d_{k-1}$ are acquired, as much computational power as needed in breaking the RSA cryptosystem will be required in order to guess the secret key d. This property is utilized in this fifth embodiment. It is to be noted that the similar algorithm using divided secret parameters for the secret key of the RSA cryptosystem is also disclosed in C. Boyd, "Some Applications of Multiple Key Ciphers", Advances in Cryptology—EUROCRYPT '88, pp. 455–467, Lecture Notes in Computer Science Vol. 330, Springer-Verlag, 1988.

Figure 19:
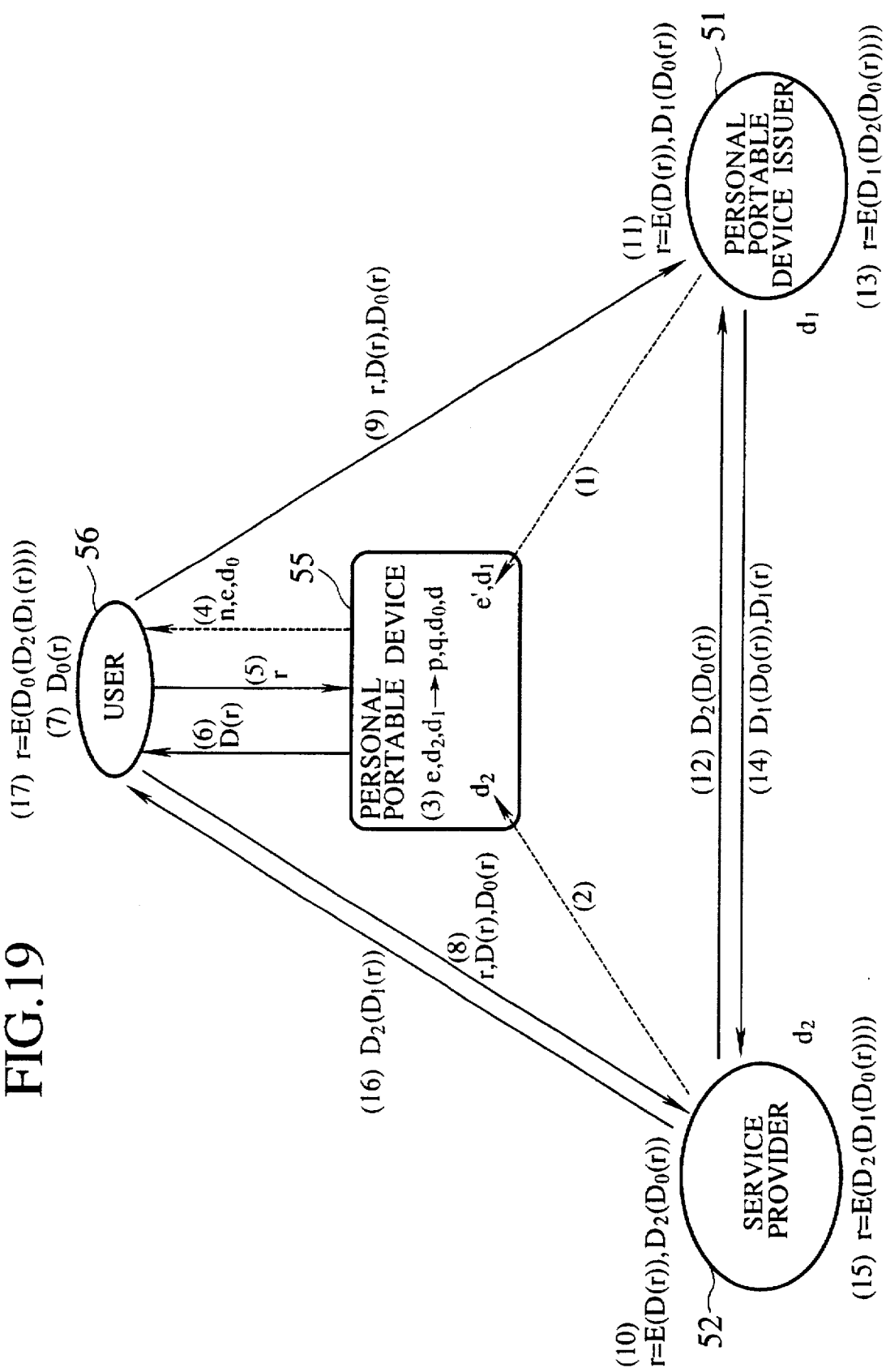
FIG. 19 is a diagram showing a key generation procedure used in the fifth embodiment of the present invention.

The procedure for generating the secret key in this fifth embodiment will now be described with reference to FIG. 19, for an exemplary case of k=3 as depicted in FIG. 17. In FIG. 19, solid lines represent operations using the network 53 while dashed lines represent operations without using the network 53.

First, the personal portable device issuer 51 who issues the personal portable device 55 enters a public key exponent initial value e' and a partial secret key $d_1$ into the personal portable device 55 (step (1) of FIG. 19).

At this point, the key generation permission judgement unit 511 judges whether the key generation is permitted or not as follows.

When a value in the corrected partial secret key memory 542 is 0, it is immediately after the personal portable device 55 is issued and the secret key has not been generated yet. Consequently, when a value in the corrected partial secret key memory 542 is 0, the key generation permission judgement unit 511 is set to the ON state in which a transition to the next stage of the key generation can be made.

When the secret key is already written in the personal portable device 55, it is required from a viewpoint of security that the secret key can be updated only when the partial secret keys needed in composing the already written secret key are known by the entities involved in the key generation, so as to prevent someone else to update the secret key at his will.

Consequently, when the secret key has already been generated, the initial values of all the currently valid partial secret keys are entered by the entities involved in the key generation from the partial secret key initial value input unit 502, and the entered partial secret key initial values are corrected at the partial secret key correction unit 531 such that each entered partial secret key becomes relatively prime with respect to the least common denominator L of (p−1) and (q−1) (p and q are prime numbers) which is stored in the key generation parameter memory 523. Then, when these corrected partial secret keys are equal to those stored in the corrected partial secret key memory 542, the key generation permission judgement unit 511 is set to the ON state, whereas otherwise the key generation permission judgement unit 511 is set to the OFF state so that the secret key cannot be updated.

When the key generation permission judgement unit 511 is in the ON state, the prime number generation unit 512 newly generates two prime numbers p and q. Then, the key generation parameter generation unit 522 generates the least common denominator L of (p−1) and (q−1). This least common denominator L is stored in the key generation parameter memory 523, while a positive integer which is less than L and relatively prime with respect to L is obtained by sequentially incrementing the public key exponent initial value e' and stored as the public key exponent e in the public key exponent storage unit 524. This public key exponent e is freely readable as it can be disclosed to the public. On the other hand, the public key modulo generation unit 513 generates the product of the two prime numbers p and q generated at the prime number generation unit 512, and stores this product as the public key modulo n in the public key modulo storage unit 514. This public key modulo n is also freely readable as it can be disclosed to the public.

In the step (1) of FIG. 19, the personal portable device issuer 51 enters the public key exponent initial value e' at the public key exponent initial value input unit 501 and the entered public key exponent initial value e' is stored in the public key exponent initial value memory 521.

Also, the personal portable device issuer 51 enters a partial secret key initial value $d_1'$ obtained from a random number at the partial secret key initial value input unit 502. The entered partial secret key initial value $d_1'$ is then corrected to be relatively prime with respect to L stored in the key generation parameter memory 523 according to a prescribed rule at the partial secret key correction unit 531, so as to obtain the partial secret key $d_1$. Here, the partial secret key correction unit 531 operates such that the same $d_1$ is always obtained for the same e, n, and $d_1'$. The simplest manner of realizing this correction is to obtain $d_1$ by sequentially incrementing $d_1'$. The corrected partial secret key $d_1$ is then stored in the corrected partial secret key memory 542.

Then, the personal portable device issuer 51 sends the personal portable device 55 to the service provider 52.

The service provider 52 similarly enters a partial secret key initial value $d_2'$ obtained from a random number at the partial secret key initial value input unit 502. Then, similarly as in a case of the personal portable device issuer 51, the entered partial secret key initial value $d_2'$ is corrected to be relatively prime with respect to L stored in the key generation parameter memory 523 according to a prescribed rule at the partial secret key correction unit 531, so as to obtain the partial secret key $d_2$. The corrected partial secret key $d_2$ is then stored in the corrected partial secret key memory 542 (step (2) of FIG. 19).

Then, the service provider 52 sends the personal portable device 55 to the user 56.

When the user 56 enters the key generation command, within the personal portable device 55, the partial secret key $d_0$ of the secret key which satisfies $e \cdot d_0 \cdot d_1 \cdot d_2 \equiv 1 \pmod{L}$ is generated from e, $d_1$, and $d_2$ at the partial secret key correction unit 531 and this partial secret key $d_0$ is stored in the corrected partial secret key memory 542. In addition, the secret key d which satisfies:

$$x^d \equiv x^{d_0 \cdot d_1 \cdot d_2} \pmod{n}$$

where n is the public key modulo and x is an arbitrary positive integer less than n is obtained by the secret key composition unit 532 and stored in the secret key storage unit 533 (step (3) of FIG. 19).

After this key generation, the user 56 enters a command for outputting the partial secret key $d_0$ at the corrected partial secret key output request input unit 503, in response to which the partial secret key $d_0$ is outputted from the corrected partial secret key memory 542 via the corrected partial secret key output unit 593. Here, however, the output of the partial secret key $d_0$ is limited to only once by means of the final partial secret key output request check unit 541. The obtained secret key d in the secret key storage unit 533 and the corrected partial secret keys in the corrected partial secret key memory 542 are strictly managed as the secret information by means of the opening detection unit 561 and the deletion command unit 562 as described above, while the user 56 discloses e and n to the public on the other hand (step (4) of FIG. 19).

Next, in order to check whether the above key generation has been carried out without any illegality, the following checking procedure is carried out.

First, the user generates a random number r as a challenge code (step (5) of FIG. 19). Then, the generated random number r is signed by using the secret key d and the public key modulo n in the personal portable device 55 to obtain D(r) (step (6) of FIG. 19). Also, the user obtains $D_0(r)$ by using the partial secret key $d_0$ and the public key modulo n, (step (7) of FIG. 19), and sends these r, D(r) and $D_0(r)$ to the service provider 52 and the personal portable device issuer 51 (steps (8) and (9) of FIG. 19). At this point, the communication path for sending these r, D(r) and $D_0(r)$ may not necessarily be the safe communication path.

The service provider 52 then calculates E(D(r)) by using r, D(r) and $D_0(r)$ received from the user 56 along with n and e disclosed by the user 56, and checks whether this E(D(r)) is equal to r or not (step (10) of FIG. 19).

When this E(D(r)) is equal to r, the service provider 52 can be convinced that the key generation has been carried out without any illegality. Then, the service provider 52 also calculates $D_2(D_0(r))$ by using the partial secret key $d_2$ (step (10) of FIG. 19), and sends this $D_2(D_0(r))$ to the personal portable device issuer 51 (step (12) of FIG. 19).

Meanwhile, the personal portable device issuer 51 also calculates E(D(r)) by using r, D(r) and $D_0(r)$ received from the user 56 along with n and e disclosed by the user 56, and checks whether this E(D(r)) is equal to r (step (11) of FIG. 19).

When this E(D(r)) is equal to r, the personal portable device issuer 51 can be convinced that the key generation has been carried out without any illegality. Then, the personal portable device issuer 51 also calculates $E(D_1(D_2(D_0(r))))$ by using the partial secret key $d_1$ and $D_2(D_0(r))$ received from the service provider 52, and checks whether this $E(D_1(D_2(D_0(r))))$ is equal to r or not (step (13) of FIG. 19).

When this $E(D_1(D_2(D_0(r))))$ is equal to r, the personal portable device issuer 51 can use this as an evidence that all the other entities are convinced that the key generation has been carried out without any illegality. Then, the personal portable device issuer 51 calculates $D_1(D_0(r))$ and $D_1(r)$, and sends these $D_1(D_0(r))$ and $D_1(r)$ to the service provider 52 (step (14) of FIG. 19).

The service provider 52 then calculates $E(D_2(D_1(D_0(r))))$ by using $D_1(D_0(r))$ received from the personal portable device issuer 51 along with d, and e, and checks whether this $E(D_2(D_1(D_0(r))))$ is equal to r or not (step (15) of FIG. 19).

When this $E(D_2(D_1(D_0(r))))$ is equal to r, the service provider 52 can use this as an evidence that all the other entities are convinced that the key generation has been carried out without any illegality. Then, the service provider 52 calculates $D_2(D_1(r))$, and sends this $D_2(D_1(r))$ to the user 56 (step (16) of FIG. 19).

The user 56 then calculates $E(D_0(D_2(D_1(r))))$ by using $D_2(D_1(r))$ received from the service provider 52 along with $d_0$ and e, and checks whether this $E(D_0(D_2(D_1(r))))$ is equal to r or not (step (17) of FIG. 19).

When this $E(D_0(D_2(D_1(r))))$ is equal to r, the user 56 can use this as an evidence that all the other entities are convinced that the key generation has been carried out without any illegality.

After these key generation and checking procedures are completed, the user 56 is ready to receive the service which requires the security. Here, when the personal portable device 55 stores secret information related to the received service, as a precautionary measure against an unexpected accident, the user 56 enciphers the secret information by using the public key in the personal portable device 55, and makes a back-up of the enciphered secret information. This back-up secret information can be deciphered only inside the personal portable device 55, so that the user 56 manages this back-up secret information separately from the personal portable device 55.

In a case in which the personal portable device 55 is lost or stolen, it becomes impossible for the owner of the personal portable device 55 to receive the service, and there is even a possibility for another person to use this personal portable device 55 illegally. Consequently, it is preferable to abandon the previously used secret key, and use a new secret key in such a case. However, if the secret key is simply changed, the data acquired from the service received up to then would be unusable. In this regard, when the back-up is made at a time of receiving the service, it is possible to minimize the amount of data which become unusable in such a case.

Now, the procedure for reissuing the personal portable device 55 when the personal portable device 55 is lost in this fifth embodiment will be described. Note that the following procedure is also applicable to a case in which the personal portable device 55 is physically destroyed due to dropping, stamping, etc.

Figure 20:
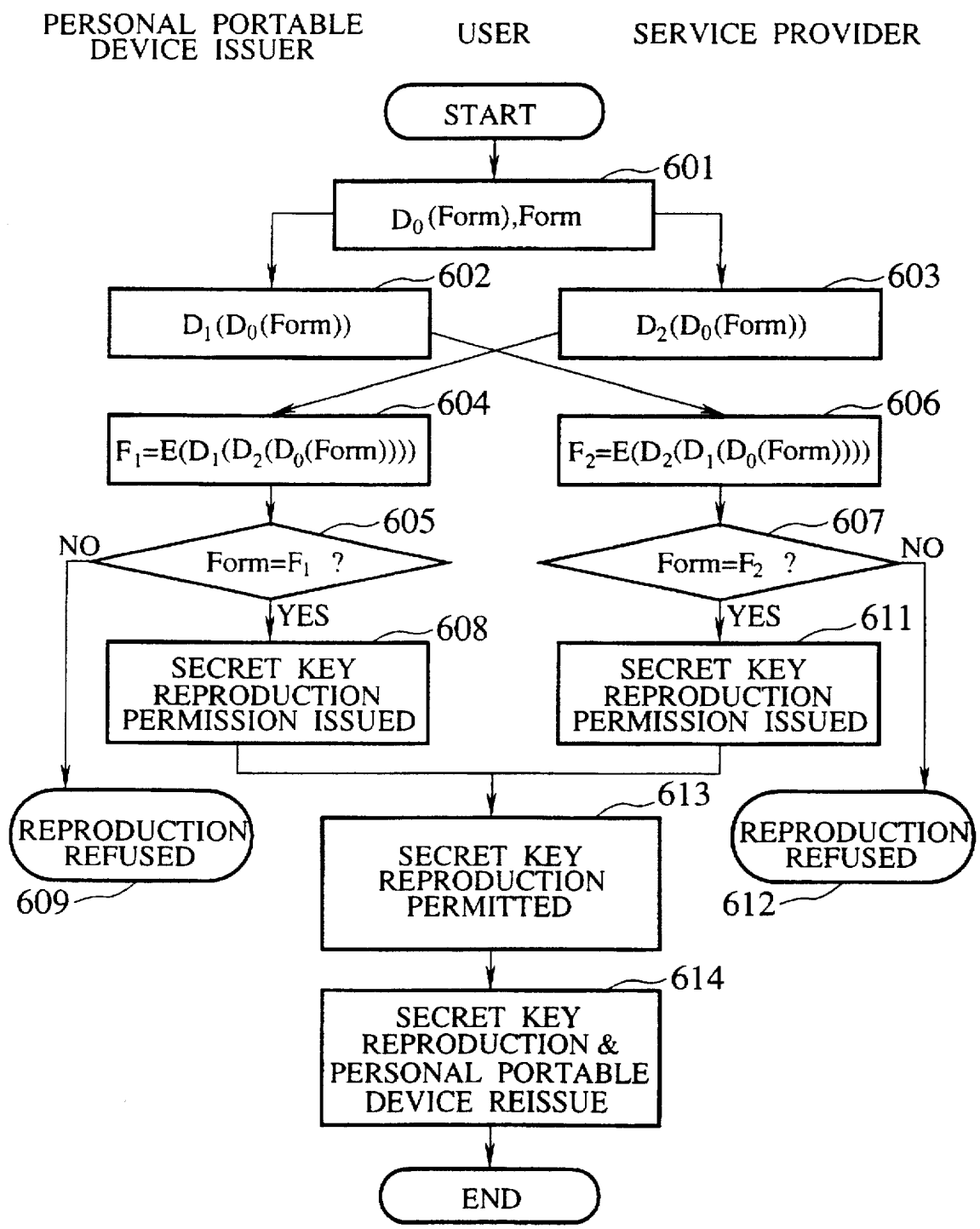
FIG. 20 is a flow chart for a secret key and personal portable device reissuing procedure in the fifth embodiment of the present invention.

When the personal portable device 55 is lost or destroyed, the secret key and personal portable device reissuing procedure shown in the flow chart of FIG. 20 is carried out as follows.

First, the user 56 produces a "request for reproduction of lost/destroyed secret key/personal portable device" as an electronic information. This electronic information can be easily produced by a word processor when the items to be described therein are determined in advance. Hereafter this "request for reproduction of lost/destroyed secret key/personal portable device" will be abbreviated as Form.

The user 56 then signs Form by using the partial secret key $d_0$ secretly owned by the user 56 and the public key modulo n, to obtain $D_0$Form). At a time of this signing, if n<Form in binary expression, it is impossible to obtain $D_0$Form) by a single calculation, so that either a message digest is produced by using the hash function and this message digest is signed, or Form is divided up and each divided part is signed separately.

The user 56 then sends the obtained $D_0$Form) along with Form to the service provider 52 and the personal portable device issuer 51 (step 601). Here, the sending of $D_0$Form) and Form may be carried out as an on-lie processing.

Next, the service provider 52 checks Form received from the user 56 to see if this user 56 has committed any illegal act intentionally in the past according to this user's past service utilization records, and judges whether the request for reissuing the personal portable device 55 is appropriate or not. When it is judged that the reissuing of the personal portable device 55 is appropriate, the service provider 52 signs $D_0$Form) received from the user 56 by using the partial secret key $d_2$ secretly owned by the service provider 52 and the public key modulo n, to obtain $D_2(D_0$Form)), and sends this $D_2(D_0$Form)) to the personal portable device issuer 51 (step 603).

On the other hand, the personal portable device issuer 51 checks Form received from the user 56 and judges whether the request for reissuing the personal portable device 55 is appropriate or not. Here, in a case where the personal portable device 55 has been destroyed, it may be also necessary to have the destroyed personal portable device 55 sent to the personal portable device issuer 51. When it is judged that the reissuing of the personal portable device 55 is appropriate, the personal portable device issuer 55 signs $D_0$Form) received from the user 56 by using the partial secret key $d_1$ secretly owned by the personal portable device issuer 51 and the public key modulo n, to obtain $D_1(D_0\text{Form}))$, and sends this $D_1(D_0\text{Form}))$ to the service provider 52 (step 602).

Then, the service provider 52 calculates $F_2=E(D_2(D_1 (D_0\text{Form}))))$ by using the partial secret key $d_2$ secretly owned by the service provider 52 and the public key (e, n) on $D_1(D_0\text{Form}))$ received from the personal portable device issuer 51 (step 606), and verifies if this $F_2=E(D_2(D_1 (D_0\text{Form}))))$ is equal to Form received from the user 56 (step 607). When this verification at the step 607 is successful, the secret key reproduction permission is issued by the service provider 52 (step 611), whereas otherwise the secret key reproduction is refused (step 612).

On the other hand, the personal portable device issuer 51 calculates $F_1=E(D_1(D_2(D_0\text{Form}))))$ by using the partial secret key $d_1$ secretly owned by the personal portable device issuer 51 and the public key (e, n) on $D_2(D_0\text{Form}))$ received from the service provider 52 (step 604), and verifies if this $F_1=E(D_1(D_2(D_0\text{Form}))))$ is equal to Form received from the user 56 (step 605). When this verification at the step 605 is successful, the secret key reproduction permission is issued by the personal portable device issuer 51 (step 608), whereas otherwise the secret key reproduction is refused (step 609).

When the secret key reproduction permissions from both the personal portable device issuer 51 and the service provider 52 are obtained, the secret key reproduction is permitted (step 613), and thereafter the secret key reproduction and personal portable device reissue procedure is carried out (step 614) similarly as in a case of newly issuing the secret key.

Note that in this secret key and personal portable device reissuing procedure, Form produced by the user 56 can be verified as correct only when this Form is signed by all three of the personal portable device issuer 51, the service provider 52, and the user 56 who are involved in the key generation. For this reason, even if some parties or parties other than some party try to forge Form by the conspiracy, the secret key cannot be reproduced in this fifth embodiment.

Consequently, in this fifth embodiment, at a time of the key generation, all the entities which are sharing mutual interests generate the secret parameters and the key is generated by writing these secret parameters into the personal portable device 55 so that no one can know the secret key generated inside the personal portable device 55. In addition, even if the secret key becomes unusable due to loss or destruction, the secret key can be reproduced and the personal portable device 55 can be reissued only when all the entities which are sharing mutual interests approve the secret key reproduction and personal portable device reissue, so that the user 56 does not have to loss all the data acquired up until then even in such a case.

Figure 21:
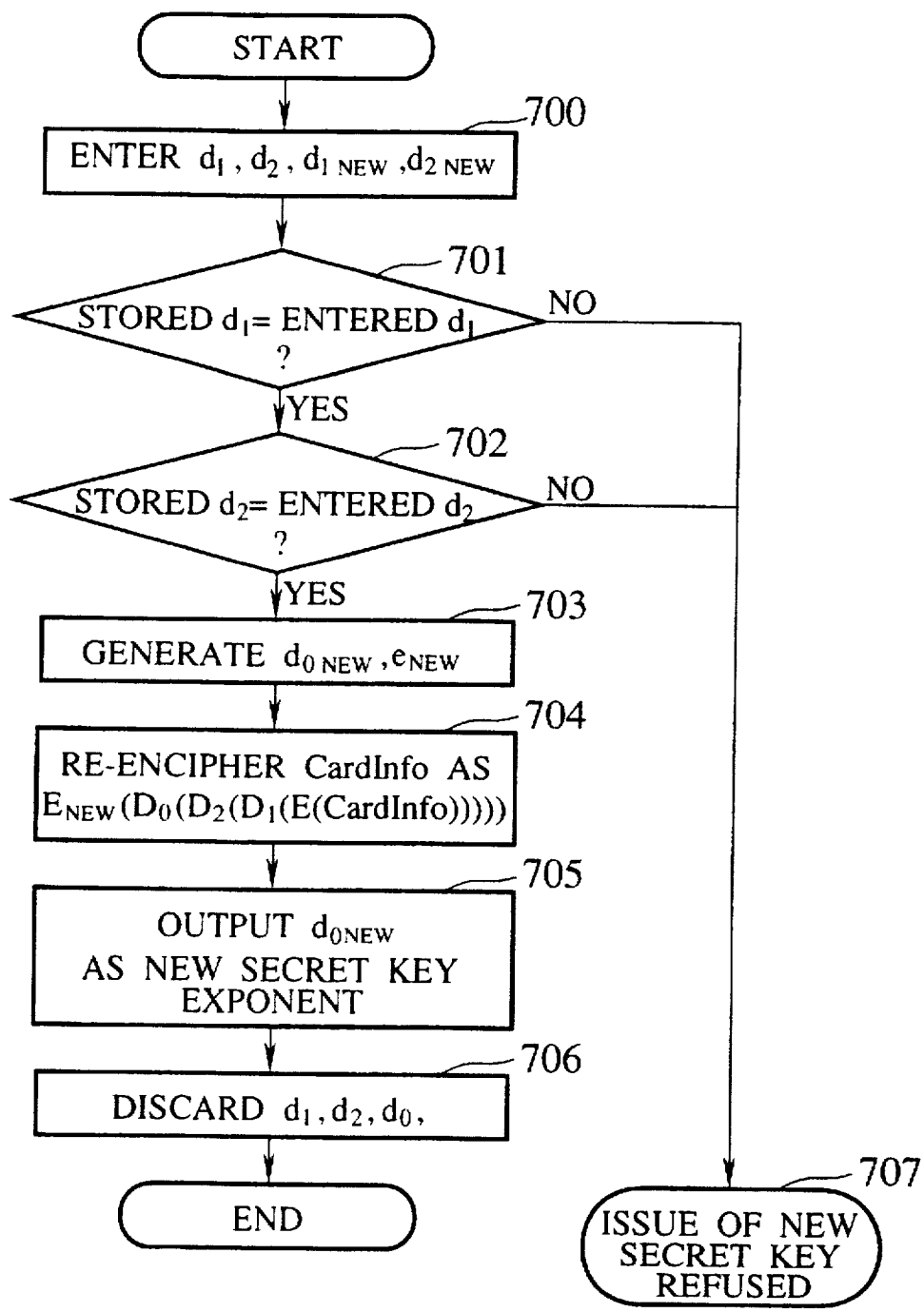
FIG. 21 is a flow chart for a secret key updating procedure in the fifth embodiment of the present invention.

It is also to be noted that, in a case of the reissuing the personal portable device 55 due to the loss of the personal portable device 55, after the original secret key is reproduced, this reproduced secret key may be replaced by a new secret key which is different from the lost secret key, according to the procedure shown in the flow chart of FIG. 21 as follows.

In this case, the user 56 enters the original partial secret key $d_0$ into the personal portable device 55 to be reissued, while the personal portable device issuer 51 enters the original partial secret key $d_1$ and a new partial secret key $d_{1NEW}$ into the personal portable device 55 to be reissued, and the service provider 52 enters the original partial secret key $d_2$ and a new partial secret key $d_{2NEW}$ into the personal portable device 55 to be reissued (step 700).

Then, whether the original partial secret key $d_1$ entered by the personal portable device issuer 51 is equal to the reproduced partial secret key $d_1$ stored in the personal portable device 55 to be reissued or not is verified (step 701), and whether the original partial secret key $d_2$ entered by the service provider 52 is equal to the reproduced partial secret key $d_2$ stored in the personal portable device 55 to be reissued or not is verified (step 702). When either one of the verifications at the steps 701 and 702 fails, the issuing of a new secret key is refused (step 707).

When both of the verifications at the steps 701 and 702 are successful, a new partial secret key $d_{0NEW}$ and a new public key exponent $e_{NEW}$ are generated by using the new partial secret keys $d_{1NEW}$ and $d_{2NEW}$ (step 703).

Then, the secret information CardInfo stored in the personal portable device 55 is re-enciphered by the new secret key as $E_{NEW}(D_0(D_2(D_1(E(\text{CardInfo})))))$ (step 704).

Then, the new partial secret key $d_{0NEW}$ is outputted to the user 56 (step 705).

Finally, the original $d_0$, $d_1$ and $d_2$ are discarded (step 706).

The secret key of the RSA cryptosystem generated or reproduced in the above described manner is such that anyone can be convinced that only the owner of this personal portable device 55 can use this secret key, and that the value of this secret key itself cannot be known by anyone including the owner of this personal portable device 55.

In other words, according to this fifth embodiment, it is possible to utilize the authentication function for the purpose of confirming a legitimate user, and even a user who purchased the digital copyrighted data cannot make illegal copies. Moreover, the same secret key as previously used in the personal portable device 55 can be reproduced without requiring a use of a specialized device for writing the secret key into the personal portable device 55, even when the personal portable device 55 is lost or destroyed by error.

Note that, in practice, the personal portable device 55 can be provided easily in a form of a standardized IC card or PC card (PCMCIA).

As for the method for actually utilizing the contents deciphered at the receiving side, those disclosed in Japanese Patent Application No. 6-298702 (1994) and Japanese Patent Application No. 6-299940 (1994) are available.

Thus according to this fifth embodiment, it is possible to provide a method and a system for generation and management of a secret key of the public key cryptosystem, in which the secret key of the public key cryptosystem can be reproduced (revived), without requiring a specialized device for writing the secret key into a personal portable device.

By using the personal portable device of this fifth embodiment, in a case of handling the digital data as commercial goods on networks, it becomes possible to prove that the user is the only one who expressed the intention to pay, and that the user cannot copy the digital data without a permission from the information provider.

Figure 22:
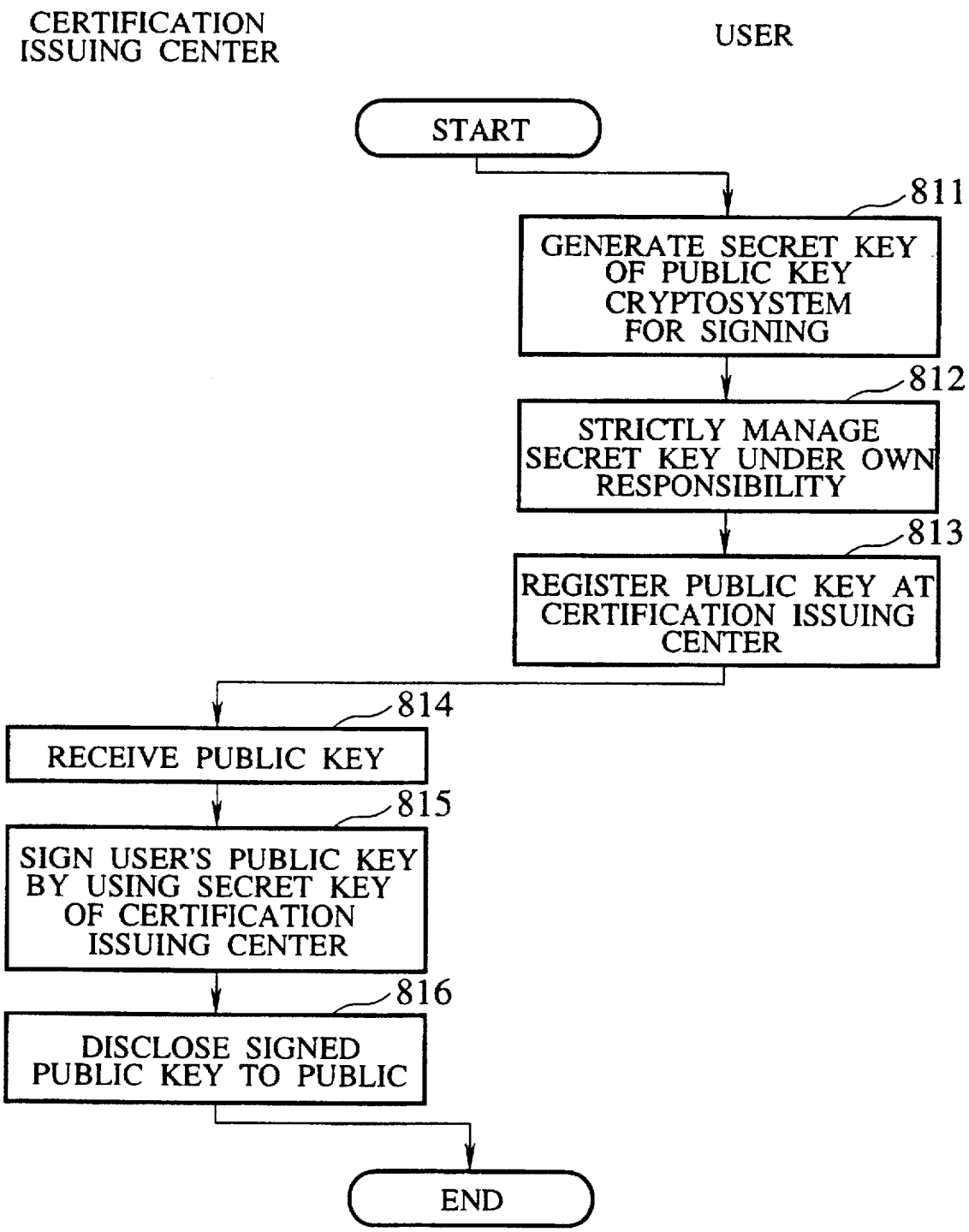
FIG. 22 is a flow chart for a procedure to generate and manage the secret key for signing in the sixth embodiment of the present invention.
Figure 23:
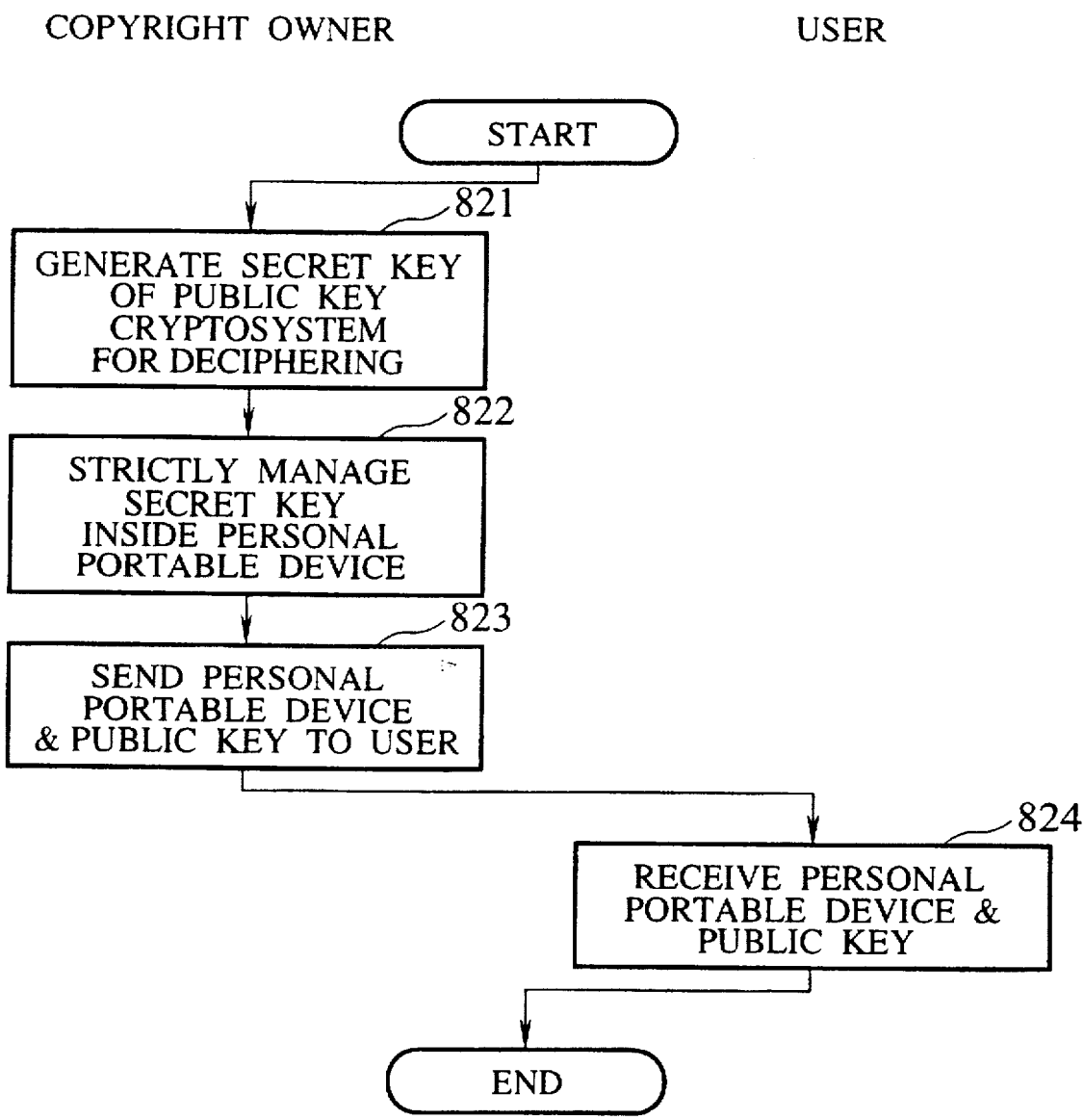
FIG. 23 is a flow chart for a procedure to generate and manage the secret key for deciphering in the sixth embodiment of the present invention.

Referring now to FIG. 22 to FIG. 23, the sixth embodiment of a method for generation and management of a secret key of the public key cryptosystem according to the present invention will be described in detail.

In this sixth embodiment, the secret key to be used for signing is generated and managed according to the procedure shown in the flow chart of FIG. 22 as follows.

First, the user himself generates the secret key of the public key cryptosystem (step 811), and the generated secret key is strictly managed under the user's own responsibility (step (812).

On the other hand, the public key is sent to the certification issuing center trusted by all the entities which shares interests with the user, and registered at the certification issuing center (step 813).

On the certification issuing center side, when the public key sent from the user is received (step 814), and the user's public key is signed by using the secret key of the certification issuing center (step 815). Then, this signed public key is disclosed to the public as this user's certification (step 816).

In this manner, it becomes possible to prove that only the user is capable of signing by using the secret key, while it becomes impossible for the user to evade the responsibility for the signature signed by using this secret key.

On the other hand, in order to make it possible for the user to use the purchased digital data, without allowing an illegal copy of the purchased digital data to anyone, the secret key of the public key cryptosystem to be used for deciphering the purchased digital data is generated and managed according to the procedure shown in the flow chart of FIG. 23 as follows. Note that this public key cryptosystem for deciphering is to be separately provided from the public key cryptosystem for signing described above.

First, the secret key of the pubic key cryptosystem for deciphering the purchased digital data is generated by the copyright owner of this digital data (step 821), and the generated secret key is strictly managed inside the personal portable device such that this secret key for deciphering can be used only inside the personal portable device and cannot be read out to the external (step 822).

Then, the personal portable device storing the secret key for deciphering therein and the public key are sent to the user (step 823).

On the user side, when the personal portable device storing the secret key for deciphering therein and the public key are received (step 824), the user can decipher the purchased digital data inside the personal portable device by using the secret key for deciphering stored therein.

Note that in this procedure of FIG. 23, the copyright owner generates the secret key of the public key cryptosystem to be used only for deciphering the digital data and confines this secret key for deciphering inside the personal portable device, so that only the copyright owner can make copies of the enciphered digital data, and therefore it is possible to prevent the illegal copy of the copyrighted digital data.

By using two different public key cryptosystems for signing and deciphering in the above described manner according to this sixth embodiment, in a case of handling the digital data as commercial goods on networks, it becomes possible to prove that the user is the only one who expressed the intention to pay, and that the user cannot copy the digital data without a permission from the information provider.

It is to be noted that, in this sixth embodiment, the secret key of the public key cryptosystem for deciphering and the secret key of the public key cryptosystem for signing may be stored in the same personal portable device, or may be stored in separate devices.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for generating and managing a secret key of a public key cryptosystem, comprising the steps of:
   (a) generating a secret key inside a tamper resistant device; and
   (b) storing the secret key generated at the step (a) into a storage region in a personal portable device from which the secret key cannot be read outside of the personal portable device, while the personal portable device is inside the tamper resistant device.

2. The method of claim 1, further comprising the step of:
   (c) using the secret key stored at the step (b) for deciphering processing and signing processing only within the personal portable device.

3. The method of claim 1, wherein the step (a) includes the steps of:
   (a1) generating a random number from a user's personal data;
   (a2) generating a public key of the public key cryptosystem from the random number generated at the step (a1); and
   (a3) generating the secret key from the public key generated at the step (a2).

4. The method of claim 1, further comprising the steps of:
   (d) generating a public key of the public key cryptosystem inside the tamper resistant device in correspondence to the secret key generated at the step (a);
   (e) storing public keys generated at the step (d) in past inside the tamper resistant device;
   (f) checking whether a new public key generated at the step (d) overlaps with any previously generated public key stored at the step (e) inside the tamper resistant device; and
   (g) producing a certification by signing the new public key generated at the step (d) inside the tamper resistant device when the step (f) indicates that the new public key is not overlapping with any previously generated public key.

5. The method of claim 4, further comprising the step of:
   (h) storing the certification produced at the step (g) into another storage region in the personal portable device from which the certification can be read outside of the personal portable device, while the personal portable device is inside the tamper resistant device.

6. The method of claim 5, wherein at the step (h), said another storage region has a writing protection to prevent any writing into said another storage region while the personal portable device is outside the tamper resistant device.

7. A tamper resistant system for generating and managing a secret key of a public key cryptosystem, comprising:
   first means for generating the secret key inside the tamper resistant system; and
   second means for storing the secret key generated by the first means into a storage region in a personal portable device from which the secret key cannot be read outside of the personal portable device, while the personal portable device is inside the tamper resistant system.

8. The system of claim 7, wherein the second means stores the secret key in the personal portable device which has a processor for carrying out deciphering processing and signing processing by using the secret key stored in the storage region only within the personal portable device.

9. The system of claim 7, wherein the first means includes:

means for generating a random number from a user's personal data;

means for generating a public key of the public key cryptosystem from the random number; and means for generating the secret key from the public key.

10. The system of claim 7, further comprising:

third means for generating a public key of the public key cryptosystem inside the tamper resistant system in correspondence to the secret key generated by the first means;

fourth means for storing public keys generated by the third means in past inside the tamper resistant system;

fifth means for checking whether a new public key generated by the third means overlaps with any previously generated public key stored by the fourth means inside the tamper resistant system; and sixth means for producing a certification by signing the new public key generated by the third means inside the tamper resistant system when the fifth means indicates that the new public key is not overlapping with any previously generated public key.

11. The system of claim 10, further comprising:

seventh means for storing the certification produced by the sixth means into another storage region in the personal portable device from which the certification can be read outside of the personal portable device, while the personal portable device is inside the tamper resistant system.

12. The system of claim 11, wherein the seventh means stores the certification in the personal portable device which has a writing protection to prevent any writing into said another storage region while the personal portable device is outside the tamper resistant system.

13. A method for generating and managing a secret key of a public key cryptosystem, comprising the steps of:

(a) generating a public key and a secret key inside a first tamper resistant device;

(b) storing the secret key generated at the step (a) into a first storage region in a personal portable device from which the secret key cannot be read outside of the personal portable device, while the personal portable device is inside the first tamper resistant device;

(c) producing a certification inside a second tamper resistant device from a user's personal data and the public key generated at the step (a); and (d) storing the certification produced at the step (c) into a second storage region in the personal portable device from which the certification can be read outside of the personal portable device, while the personal portable device is inside the first tamper resistant device.

14. The method of claim 13, wherein the step (a) includes the steps of:

(a1) generating a random number from the user's personal data;

(a2) generating the public key from the random number generated at the step (a1); and (a3) generating the secret key from the public key generated at the step (a2).

15. The method of claim 13, wherein at the step (d), the second storage region has a writing protection to prevent any writing into the second storage region while the personal portable device is outside the first tamper resistant device.

16. The method of claim 13, wherein the personal portable device comprises a first device containing the first storage region for storing the secret key and a second device containing the second storage region for storing the certification.

17. The method of claim 13, further comprising the steps of:

(e) producing a certification request inside the first tamper resistant device from the user's personal data and the public key generated at the step (a);

(f) signing the certification request produced at the step (e) by the secret key generated at the step (a) to obtain a signed certification request inside the first tamper resistant device; and (g) sending the certification request produced at the step (e) and the signed certification request obtained at the step (f) from the first tamper resistant device to the second tamper resistant device, so that the step (c) produces the certification by using the certification request and the signed certification request.

18. The method of claim 17, further comprising the step of:

(h) verifying the signed certification request inside the second tamper resistant device to judge whether the certification request has been tampered between the first tamper resistant device and the second tamper resistant device, such that the step (c) produces the certification only when the signed certification request is verified.

19. The method of claim 17, further comprising the step of:

(i) judging inside the second tamper resistant device whether the user's personal data directly received from a user matches with the user's personal data contained in the certification request, such that the step (c) produces the certification only when the user's personal data directly received from a user matches with the user's personal data contained in the certification request.

20. The method of claim 17, further comprising the step of:

(j) storing public keys used in past inside the second tamper resistant device; and (k) checking inside the second tamper resistant device whether the public key contained in the certification request overlaps with any previously used public key stored at the step (j), such that the step (c) produces the certification only when the step (j) indicates that the public key contained in the certification request is not overlapping with any previously used public key.

21. The method of claim 13, further comprising the steps of:

(l) signing the certification produced at the step (c) by using a secret key of the second tamper resistant device to obtain a signed certification inside the second tamper resistant device; and (m) sending the certification produced at the step (c) and the signed certification obtained at the step (l) from the second tamper resistant device to the first tamper resistant device, so that the step (d) stores the certification into the second storage region in the personal portable device by using the certification and the signed certification.

22. The method of claim 21, further comprising the step of:

(n) verifying the signed certification inside the first tamper resistant device to judge whether the certification has been tampered between the second tamper resistant device and the first tamper resistant device, such that the step (b) stores the secret key and the step (d) stores the certification only when the signed certification is verified.

23. The method of claim 13, further comprising the step of:
- (o) using the secret key stored at the step (b) for deciphering processing and signing processing only within the personal portable device.

24. A system for generating and managing a secret key of a public key cryptosystem, comprising:
- a first tamper resistant device having:
  - first means for generating a public key and the secret key inside the first tamper resistant device;
  - second means for storing the secret key generated by the first means into a first storage region in a personal portable device from which the secret key cannot be read outside of the personal portable device, while the personal portable device is inside the first tamper resistant device; and
  - third means for storing the certification into a second storage region in the personal portable device from which the certification can be read outside of the personal portable device, while the personal portable device is inside the first tamper resistant device; and
- a second tamper resistant device having:
  - fourth means for producing the certification inside the second tamper resistant device from a user's personal data and the public key generated by the first means, such that the third means stores the certification produced by the fourth means.

25. The system of claim 24, wherein the first means includes:
- means for generating a random number from the user's personal data;
- means for generating the public key from the random number; and
- means for generating the secret key from the public key.

26. The system of claim 24, wherein the third means stores the certification in the personal portable device which has a writing protection to prevent any writing into the second storage region while the personal portable device is outside the first tamper resistant device.

27. The system of claim 24, wherein the personal portable device comprises a first device containing the first storage region for storing the secret key and a second device containing the second storage region for storing the certification, so that the second means stores the secret key into the first device while the third means stores the certification into the second device.

28. The system of claim 24, wherein the first tamper resistant device also has:
- fifth means for producing a certification request inside the first tamper resistant device from the user's personal data and the public key generated by the first means;
- sixth means for signing the certification request produced by the fifth means by the secret key generated by the first means to obtain a signed certification request inside the first tamper resistant device; and
- seventh means for sending the certification request produced by the fifth means and the signed certification request obtained by the sixth means from the first tamper resistant device to the second tamper resistant device, so that the fourth means produces the certification by using the certification request and the signed certification request.

29. The system of claim 28, wherein the second tamper resistant device also has:
- means for verifying the signed certification request inside the second tamper resistant device to judge whether the certification request has been tampered between the first tamper resistant device and the second tamper resistant device, such that the fourth means produces the certification only when the signed certification request is verified.

30. The system of claim 28, wherein the second tamper resistant device also has:
- means for judging inside the second tamper resistant device whether the user's personal data directly received from a user matches with the user's personal data contained in the certification request, such that the fourth means produces the certification only when the the user's personal data directly received from a user matches with the user's personal data contained in the certification request.

31. The system of claim 28, wherein the second tamper resistant device also has:
- storing means for storing public keys used in past inside the second tamper resistant device; and
- checking means for checking inside the second tamper resistant device whether the public key contained in the certification request overlaps with any previously used public key stored by the storing means, such that the fourth means produces the certification only when the checking means indicates that the public key contained in the certification request is not overlapping with any previously used public key.

32. The system of claim 24, wherein the second tamper resistant device also has:
- signing means for signing the certification produced by the fourth means by using a secret key of the second tamper resistant device to obtain a signed certification inside the second tamper resistant device; and
- sending means for sending the certification produced by the fourth means and the signed certification obtained by the signing means from the second tamper resistant device to the first tamper resistant device, so that the third means stores the certification into the second storage region in the personal portable device by using the certification and the signed certification.

33. The system of claim 32, wherein the first tamper resistant device also has:
- means for verifying the signed certification inside the first tamper resistant device to judge whether the certification has been tampered between the second tamper resistant device and the first tamper resistant device, such that the second means stores the secret key and the third means stores the certification only when the signed certification is verified.

34. The system of claim 24, wherein the second means stores the secret key in the personal portable device which has a processor for carrying out deciphering processing and signing processing by using the secret key stored in the first storage region only within the personal portable device.

35. A method for reproducing a secret key of a public key cryptosystem, comprising the steps of:
- (a) designating a plurality of arbitrators for separately judging an appropriateness of a secret key reproduction;
- (b) distributing partial secret keys dividing an information necessary in reproducing the secret key among the arbitrators;
- (c) collecting the partial secret keys from those arbitrators who judge that the secret key reproduction is appropriate when the secret key reproduction is requested; and (d) reproducing the secret key from the partial secret keys collected at the step (c) when the partial secret keys collected at the step (c) satisfy a prescribed secret key reproduction necessary condition.

36. The method of claim 35, wherein at the step (b), the partial secret keys divide the information necessary in reproducing the secret key such that the secret key can be reproduced from at least a predetermined number of the partial secret keys.

37. The method of claim 35, wherein at the step (d), the prescribed secret key reproduction necessary condition includes a secret key reproduction indispensable condition which specifies a selected arbitrator whose approval of the secret key reproduction is required for satisfying the secret key reproduction necessary condition.

38. The method of claim 35, wherein at the step (d), the prescribed secret key reproduction necessary condition includes a secret key reproduction threshold condition which specifies at least k arbitrators out of j arbitrators (j>k>0) whose approval of the secret key reproduction is required for satisfying the secret key reproduction necessary condition.

39. The method of claim 35, wherein at the step (d), the prescribed secret key reproduction necessary condition includes a secret key reproduction order condition which specifies an order for obtaining approval of the secret key reproduction from the arbitrators which is required in satisfying the secret key reproduction necessary condition.

40. The method of claim 35, wherein the secret key is generated inside a tamper resistant device, and stored in a personal portable device while the personal portable device is inside the tamper resistant device, into a storage region in the personal portable device from which the secret key cannot be read outside of the personal portable device, and the secret key is reproduced at the step (d) inside the tamper resistant device, and stored in the personal portable device while the personal portable device is inside the tamper resistant device, into the storage region in the personal portable device.

41. The method of claim 40, further comprising the steps of:

making a back-up of enciphered information to be deciphered by the secret key which is stored inside the personal portable device, before the secret key reproduction becomes necessary; and restoring the enciphered information from the back-up to the personal portable device after the secret key is reproduced.

42. A system for reproducing a secret key of a public key cryptosystem, comprising:

distributing means for distributing partial secret keys which divide an information necessary in reproducing the secret key among a plurality of arbitrators for separately judging an appropriateness of a secret key reproduction;

collecting means for collecting the partial secret keys from those arbitrators who judge that the secret key reproduction is appropriate when the secret key reproduction is requested; and reproducing means for reproducing the secret key from the partial secret keys collected by the collecting means when the partial secret keys collected by the collecting means satisfy a prescribed secret key reproduction necessary condition.

43. The system of claim 42, wherein the partial secret keys divide the information necessary in reproducing the secret key such that the secret key can be reproduced from at least a predetermined number of the partial secret keys.

44. The system of claim 42, wherein the prescribed secret key reproduction necessary condition includes a secret key reproduction indispensable condition which specifies a selected arbitrator whose approval of the secret key reproduction is required for satisfying the secret key reproduction necessary condition.

45. The system of claim 42, wherein the prescribed secret key reproduction necessary condition includes a secret key reproduction threshold condition which specifies at least k arbitrators out of j arbitrators (j>k>0) whose approval of the secret key reproduction is required for satisfying the secret key reproduction necessary condition.

46. The system of claim 42, wherein the prescribed secret key reproduction necessary condition includes a secret key reproduction order condition which specifies an order for obtaining approval of the secret key reproduction from the arbitrators which is required in satisfying the secret key reproduction necessary condition.

47. The system of claim 42, wherein the secret key is generated inside a tamper resistant device, and stored in a personal portable device while the personal portable device is inside the tamper resistant device, into a storage region in the personal portable device from which the secret key cannot be read outside of the personal portable device, and the reproducing means reproduces the secret key inside the tamper resistant device, and stores the secret key in the personal portable device while the personal portable device is inside the tamper resistant device, into the storage region in the personal portable device.

48. The system of claim 47, further comprising:

means for making a back-up of enciphered information to be deciphered by the secret key which is stored inside the personal portable device, before the secret key reproduction becomes necessary; and means for restoring the enciphered information from the back-up to the personal portable device after the secret key is reproduced.

49. A method for generating and managing a secret key of a public key cryptosystem, comprising the steps of:

(a) generating a secret key inside a tamper resistant personal portable device; and (b) storing the secret key generated at the step (a) into a storage region in the tamper resistant personal portable device from which the secret key cannot be read outside of the tamper resistant personal portable device.

50. The method of claim 49, further comprising the step of:

(c) using the secret key stored at the step (b) for deciphering processing and signing processing only within the tamper resistant personal portable device.

51. The method of claim 49, wherein the step (a) includes the steps of:

(a1) generating a random number; and (a2) generating a public key of the public key cryptosystem and the secret key from the random number generated at the step (a1).

52. The method of claim 49, further comprising the steps of:

(d) detecting an opening of a cover of the tamper resistant personal portable device; and (e) deleting the secret key from the storage region when the opening of the cover of the tamper resistant personal portable device is detected at the step (d).

53. The method of claim 52, further comprising the step of:

(f) destroying elements implemented inside the tamper resistant personal portable device so as to make the tamper resistant personal portable device unusable when the opening of the cover of the tamper resistant personal portable device is detected at the step (d).

54. A tamper resistant personal portable device for generating and managing a secret key of a public key cryptosystem, comprising:

first means for generating a secret key inside the tamper resistant personal portable device; and second means for storing the secret key generated by the first means into a storage region from which the secret key cannot be read outside of the tamper resistant personal portable device.

55. The device of claim 54, further comprising:

a processor for carrying out deciphering processing and signing processing by using the secret key stored in the storage region only within the tamper resistant personal portable device.

56. The device of claim 54, wherein the first means includes:

means for generating a random number; and means for generating a public key of the public key cryptosystem and the secret key from the random number.

57. The device of claim 54, further comprising:

opening detection means for detecting an opening of a cover of the tamper resistant personal portable device; and means for deleting the secret key from the storage region when the opening of the cover of the tamper resistant personal portable device is detected by the opening detection means.

58. The device of claim 57, further comprising:

means for destroying elements implemented inside the tamper resistant personal portable device so as to make the tamper resistant personal portable device unusable when the opening of the cover of the tamper resistant personal portable device is detected by the opening detection means.

59. A method for generating and managing a secret key of a public key cryptosystem, comprising the steps of:

(a) separately entering each one of partial secret keys for constituting the secret key from all entities sharing interests with a user of a tamper resistant personal portable device, into the tamper resistant personal portable device, each partial secret key being secretly managed by each entity;

(b) generating a secret key inside the tamper resistant personal portable device from the partial secret keys entered at the step (a); and (c) storing the secret key generated at the step (a) into a storage region in the tamper resistant personal portable device from which the secret key cannot be read outside of the tamper resistant personal portable device.

60. The method of claim 59, further comprising the step of:

(d) using the secret key stored at the step (b) for deciphering processing and signing processing only within the tamper resistant personal portable device.

61. The method of claim 59, further comprising the steps of:

(e) detecting an opening of a cover of the tamper resistant personal portable device; and (f) deleting the secret key from the storage region when the opening of the cover of the tamper resistant personal portable device is detected at the step (e).

62. The method of claim 61, further comprising the step of:

(g) destroying elements implemented inside the tamper resistant personal portable device so as to make the tamper resistant personal portable device unusable when the opening of the cover of the tamper resistant personal portable device is detected at the step (e).

63. The method of claim 59, further comprising the steps of:

(h) when a secret key reproduction due to a loss of the secret key in the tamper resistant personal portable device is requested by the user, separately entering each one of the partial secret keys from all the entities sharing interests with the user into the tamper resistant personal portable device again;

(i) generating the secret key inside the tamper resistant personal portable device from the partial secret keys entered at the step (k) again; and (j) storing the secret key generated at the step (i) into the storage region again.

64. The method of claim 59, further comprising the steps of:

(k) when a secret key reproduction due to a destruction of the tamper resistant personal portable device is requested by the user, separately entering each one of the partial secret keys from all the entities sharing interests with the user into a new tamper resistant personal portable device;

(l) generating the secret key inside the new tamper resistant personal portable device from the partial secret keys entered at the step (k); and (m) storing the secret key generated at the step (l) into a storage region in the new tamper resistant personal portable device from which the secret key cannot be read outside of the new tamper resistant personal portable device.

65. The method of claim 59, further comprising the steps of:

(n) separately entering each one of new partial secret keys for constituting a new secret key from all the entities sharing interests with the user, into the tamper resistant personal portable device, each new partial secret key being secretly managed by each entity;

(o) generating the new secret key inside the tamper resistant personal portable device from the new partial secret keys entered at the step (n); and (p) storing the new secret key generated at the step (o) into the storage region by overwriting an original secret key.

66. The method of claim 59, further comprising the steps of:

making a back-up of enciphered information to be deciphered by the secret key stored in the storage region, before a secret key reproduction becomes necessary; and restoring the enciphered information from the back-up to the tamper resistant personal portable device after the secret key is reproduced.

67. The method of claim 59, further comprising the steps of:

making a back-up of enciphered information to be deciphered by an original secret key stored in the storage regions before a secret key reproduction and updating becomes necessary;

restoring the enciphered information from the back-up to the tamper resistant personal portable device after the secret key is reproduced but before the secret key is updated;

deciphering the enciphered information inside the tamper resistant personal portable device by using a reproduced secret key after the secret key is reproduced but before the secret key is updated; and enciphering the information deciphered at the deciphering step inside the tamper resistant personal portable device by using an updated secret key after the secret key is reproduced and updated.

68. The method of claim 59, further comprising the steps of:

(q) generating two prime numbers p and q, and setting a least common denominator of (p–1) and (q–1) as L;

(r) setting a product of p and q as a public key modulo n, and a positive integer which is less than L and relatively prime with respect to L as a public key exponent e;

(s) selecting (k–1) pieces of positive integers each of which is less than L and relatively prime with respect to L as the partial secret keys $d_1, d_2, \ldots, d_{k-1}$, where k–1 is a number of the entities;

(t) generating a user's partial secret key $d_0$ which satisfies:

$$e \cdot d_0 \cdot d_1 \cdot d_2 \cdot \ldots \cdot d_{k-1} \equiv 1 \pmod{L}$$

such that the step (b) generates the secret key d which satisfies:

$$x^d \equiv x^{d_0 \cdot d_1 \cdot d_2 \cdot \ldots \cdot d_{k-1}} \pmod{n}$$

where x is an arbitrary positive integer less than n.

69. The method of claim 59, further comprising the steps of:

distributing a random number to all the entities;

sequentially signing the random number by using the partial secret keys of all the entities; and verifying the sequentially signed random number by using a public key at each entity, and confirming that the secret key is generated without any illegality at each entity when the sequentially signed random number is successfully verified.

70. The method of claim 59, further comprising the steps of:

distributing a secret key reproduction request to all the entities;

sequentially signing the secret key reproduction request by using the partial secret keys of all the entities; and verifying the sequentially signed secret key reproduction request by using a public key at each entity, and issuing a permission for a secret key reproduction from each entity when the sequentially signed secret key reproduction request is successfully verified.

71. A tamper resistant personal portable device for generating and managing a secret key of a public key cryptosystem, comprising:

first means for separately entering each one of partial secret keys for constituting the secret key from all entities sharing interests with a user of the tamper resistant personal portable device, into the tamper resistant personal portable device, each partial secret key being secretly managed by each entity;

second means for generating a secret key inside the tamper resistant personal portable device from the partial secret keys entered by the first means; and third means for storing the secret key generated by the second means into a storage region from which the secret key cannot be read outside of the tamper resistant personal portable device.

72. The device of claim 71, further comprising:

a processor for carrying out deciphering processing and signing processing by using the secret key stored in the storage region only within the tamper resistant personal portable device.

73. The device of claim 71, further comprising:

opening detection means for detecting an opening of a cover of the tamper resistant personal portable device; and means for deleting the secret key from the storage region when the opening of the cover of the tamper resistant personal portable device is detected by the opening detection means.

74. The device of claim 73, further comprising:

means for destroying elements implemented inside the tamper resistant personal portable device so as to make the tamper resistant personal portable device unusable when the opening of the cover of the tamper resistant personal portable device is detected by the opening detection means.

75. The device of claim 71, wherein when a secret key reproduction due to a loss of the secret key in the tamper resistant personal portable device is requested by the user, the first means separately enters each one of the partial secret keys from all the entities sharing interests with the user into the tamper resistant personal portable device again, the second means generates the secret key inside the tamper resistant personal portable device from the partial secret keys entered by the first means again, and the third means stores the secret key generated by the second means into the storage region again.

76. The device of claim 71, wherein the first means also separately enters each one of new partial secret keys for constituting a new secret key from all the entities sharing interests with the user, into the tamper resistant personal portable device, each new partial secret key being secretly managed by each entity, the second means also generates the new secret key inside the tamper resistant personal portable device from the new partial secret keys entered by the first means, and the third means also stores the new secret key generated by the second means into the storage region by overwriting an original secret key.

77. The device of claim 71, further comprising:

means for generating two prime numbers p and q, and setting a least common denominator of (p–1) and (q–1) as L;

means for setting a product of p and q as a public key modulo n;

means for setting a positive integer which is less than L and relatively prime with respect to L as a public key exponent e;

means for selecting (k–1) pieces of positive integers each of which is less than L and relatively prime with respect to L as the partial secret keys $d_1, d_2, \ldots, d_{k-1}$, where k–1 is a number of the entities;

means for generating a user's partial secret key $d_0$ which satisfies:

$$e \cdot d_0 \cdot d_1 \cdot d_2 \cdot \ldots \cdot d_{k-1} \equiv 1 \pmod{L}$$

such that the second means generates the secret key d which satisfies:

$$x^d \equiv x^{d_0 \cdot d_1 \cdot d_2 \cdot \ldots \cdot d_{k-1}} \pmod{n}$$

where x is an arbitrary positive integer less than n.

78. The device of claim 77, further comprising means for outputting the user's partial secret key $d_0$ from the tamper resistive personal portable device only once.

79. A method for handling digital data using public key cryptosystems, comprising the steps of:

(a) generating at a user's side a public key and a secret key of a first public key cryptosystem for signing;

(b) registering the public key of the first public key cryptosystem at a certification issuing center; and (c) signing the public key of the first public key cryptosystem by using a secret key of the certification issuing center, and disclosing the signed public key as a user's certification;

(d) generating at a copyright owner's side a public key and a secret key of a second public key cryptosystem for deciphering digital data, and storing the secret key of the second public key cryptosystem into a storage region in a tamper resistant personal portable device from which the secret key of the second public key cryptosystem cannot be read outside of the tamper resistant personal portable device;

(e) providing the tamper resistant personal portable device and the public key of the second public key cryptosystem to the user's side, such that the user's side can utilize the digital data provided by the copyright owner's side by carrying out deciphering processing using the secret key of the second public key cryptosystem and signing processing using the secret key of the first public key cryptosystem within the tamper resistant personal portable device.

* * * * *